(12) United States Patent
Meuser et al.

(10) Patent No.: US 12,308,032 B1
(45) Date of Patent: May 20, 2025

(54) SYSTEM AND METHODS FOR AUDIO DATA ANALYSIS AND TAGGING

(71) Applicant: Palantir Technologies Inc., Denver, CO (US)

(72) Inventors: Ashley Meuser, Arlington, VA (US); Emma Langfitt, New York, NY (US); Jessica Headrick, New York, NY (US); Megha Arora, London (GB); Madeleine Brickell, Arlington, VA (US); Scott Cook, Alexandria, VA (US); Shomik Jain, Washington, DC (US); Stewart Beckendorff, Washington, DC (US); Tate Krasner, Washington, DC (US); Ryan Hermstein, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 352 days.

(21) Appl. No.: 17/655,331

(22) Filed: Mar. 17, 2022

Related U.S. Application Data

(60) Provisional application No. 63/163,321, filed on Mar. 19, 2021.

(51) Int. Cl.
*G10L 17/14* (2013.01)
*G06F 3/0482* (2013.01)
(Continued)

(52) U.S. Cl.
CPC ............ *G10L 17/14* (2013.01); *G06F 3/0482* (2013.01); *G06F 3/165* (2013.01); *G06F 40/117* (2020.01);
(Continued)

(58) Field of Classification Search
CPC ....... G10L 17/14; G10L 17/04; G10L 21/028; G06F 3/0482; G06F 3/165; G06F 40/117;
(Continued)

(56) References Cited

U.S. PATENT DOCUMENTS

| 8,200,775 | B2 | 6/2012 | Moore |
| 8,230,343 | B2 | 7/2012 | Logan et al. |

(Continued)

*Primary Examiner* — Pierre Louis Desir
*Assistant Examiner* — Keisha Y. Castillo-Torres
(74) *Attorney, Agent, or Firm* — Knobbe, Martens, Olson & Bear, LLP

(57) ABSTRACT

A system for automated processing and analysis of audio files for large data sets in a cloud environment. A unified analytic environment can integrate audio machine learning models for processing and analysis with a knowledge management system, including graph presentations of tracked entities, linked to audio files and/or associated translations and transcripts. Entities within such data can be searched or filtered and proposed for tracking, or identified as tracked objects. These features can allow triage and prioritization of audio files for analysis. User interfaces can facilitate feedback on transcription and translation outputs, thereby improving present outputs and future inputs and outputs. Entities speaking or referred to can be found, tagged, and distinguished in audio files (e.g., using speaker identification in audio files, text searching in transcripts, etc.) Users can provide feedback and input on various aspects of a system, to enhance or adjust initial automated or other machine learning outputs.

13 Claims, 17 Drawing Sheets

(51) Int. Cl.
    *G06F 3/16*     (2006.01)
    *G06F 40/117*     (2020.01)
    *G06F 40/279*     (2020.01)
    *G06F 40/58*     (2020.01)
    *G10L 17/04*     (2013.01)
    *G10L 21/028*     (2013.01)

(52) U.S. Cl.
    CPC ............ *G06F 40/279* (2020.01); *G06F 40/58* (2020.01); *G10L 17/04* (2013.01); *G10L 21/028* (2013.01); *G06F 2203/04803* (2013.01)

(58) Field of Classification Search
    CPC ................. G06F 40/279; G06F 40/58; G06F 2203/04803
    See application file for complete search history.

(56) References Cited

U.S. PATENT DOCUMENTS

| | | | |
|---|---|---|---|
| 10,931,819 B2 | 2/2021 | Kats et al. | |
| 11,200,885 B1 * | 12/2021 | Mandal | G06F 40/279 |
| 11,947,872 B1 * | 4/2024 | Mahler-Haug | G10L 15/14 |
| 2012/0275761 A1 * | 11/2012 | Li | H04N 9/8233 |
| | | | 386/239 |
| 2018/0133900 A1 | 5/2018 | Breazeal et al. | |
| 2018/0143974 A1 * | 5/2018 | Skarbovsky | G06F 40/58 |
| 2018/0165723 A1 | 6/2018 | Wright et al. | |
| 2019/0052701 A1 | 2/2019 | Rathod | |
| 2021/0051148 A1 * | 2/2021 | Parikh | H04L 67/60 |
| 2021/0224319 A1 * | 7/2021 | Ingel | G06F 16/686 |

* cited by examiner

◁)) radio-Europe-23 January 2034-1.wav ✗ English ▽

Transcript from radio-Europe-23 January 2034-1.wav ← 422

ⓘ This transcript has been automatically derived from the audio file and automatically translated to English. See full provenance. ← 424

What to start?
Their security service of the president from the materials becomes clear that as health deteriorates, if more and more falls dependence on their closest advisors, the president is gravely ill reads the headline 4 issue ← 484 of the weekly voice author of the material.

Its arcade.

⟨ ✐ 📄 ⟩ ← 482

| Tag as Object |
| Tag as Link |
| Tag as Property |
| Recently Tagged |
| Select Existing Tags |
| Select Multiple |
| Copy |

Hermione, referring to the opinion of doctors, lists a bouquet of diseases Jones, in the material is quoted by the statement of journalist Esmerelda Lopez which was n then.
Became.

That Jones has something like sclerosis of the brain vessels and he is cut down in the middle of the 77% ← 492
working day. They cannot forget words, make independent decisions.

Yes I do?
Send?

⤺5s◁ ▷Play ▷5s⤻ ← 472

00:00:00

Unknown speaker 0

File history | Share

Record Properties

Date        October 10,2030 01:07:13.389-0:00
ID Nuber    radio-Europe-23 January 2034
Person Count  1
Suggested tags  22

542

3 models applied ▽

✗ Liver angina - Entity                    ⑦      552
String        Liver angina
| ✓ Tag | ✗ Reject |

✗ Weekly voice author - Entity             ⑦
String        President is gravely ill
| ✓ Tag | ✗ Reject |

✗ The President - Entity                   ⑦
String        The President
| ✓ Tag | ✗ Reject |

Extracted Data                             ✱

🔍 Filter...                                       562

👤 Mr. Jones - Person                              564
Name          Jones

👤 Ms. Lopez - Person
String        Esmerelda Lopez

⊠ Ava identified a potential reference to Mr. jones in a machine translated audio recording.
To continue investigating, drag the audio record into the audio application.

[Ava] [Audio]

🕀 ✏ Listen and View Transcript    ✕ Unrelated

Alert graph

[Mr. jones]---------[🌐 Radio-europe-23 ja.....]    Add all to... ▽

Alert details  Graph details

🌐 Radio-Europe-23 January 2034            < Object 2 of 2 >
≡ Audio
Properties
  Other properties
  Date           October 10, 2030 01:07:13.389- 0:00      Unmarked
  ID number      radio-Europe-23 January 2034             Unmarked
  Person count   1                                        Unmarked
⚭ Links
  ⌄ Sourced from record
    Mr. jones            Esmerelda lopez         Person z
    Norwegian government
  ⌄ Appears in (1)
    Mr. jones Sorted by: Newest

FIG. 11A

SYSTEM AND METHODS FOR AUDIO DATA ANALYSIS AND TAGGING

CROSS-REFERENCE TO RELATED APPLICATIONS

This application claims benefit of U.S. Provisional Patent Application No. 63/163,321, filed Mar. 19, 2021, and titled "SYSTEM AND METHODS FOR AUDIO DATA ANALYSIS AND TAGGING."

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for data integration, analysis, and visualization. More specifically, review and analysis of audio files can be automated and streamlined in an integrated analytic environment.

BACKGROUND

Many large audio databases are time-intensive to review and can be very difficult to analyze.

SUMMARY

This disclosure provides an integrated analytic environment for locating, understanding, analyzing, and tracking information within large audio datasets. Tools and methods are described for processing such databases in an interactive and efficient way.

BRIEF DESCRIPTION OF THE DRAWINGS

FIG. 4 illustrates an example interface implementing features described in FIG. 3.

FIG. 5 illustrates further interface feature examples.

FIG. 10 illustrates an alerts portion for a knowledge management system containing audio files.

FIG. 11A illustrates an example graph details interface for an audio file.

DETAILED DESCRIPTION

Overview

Figure 1:
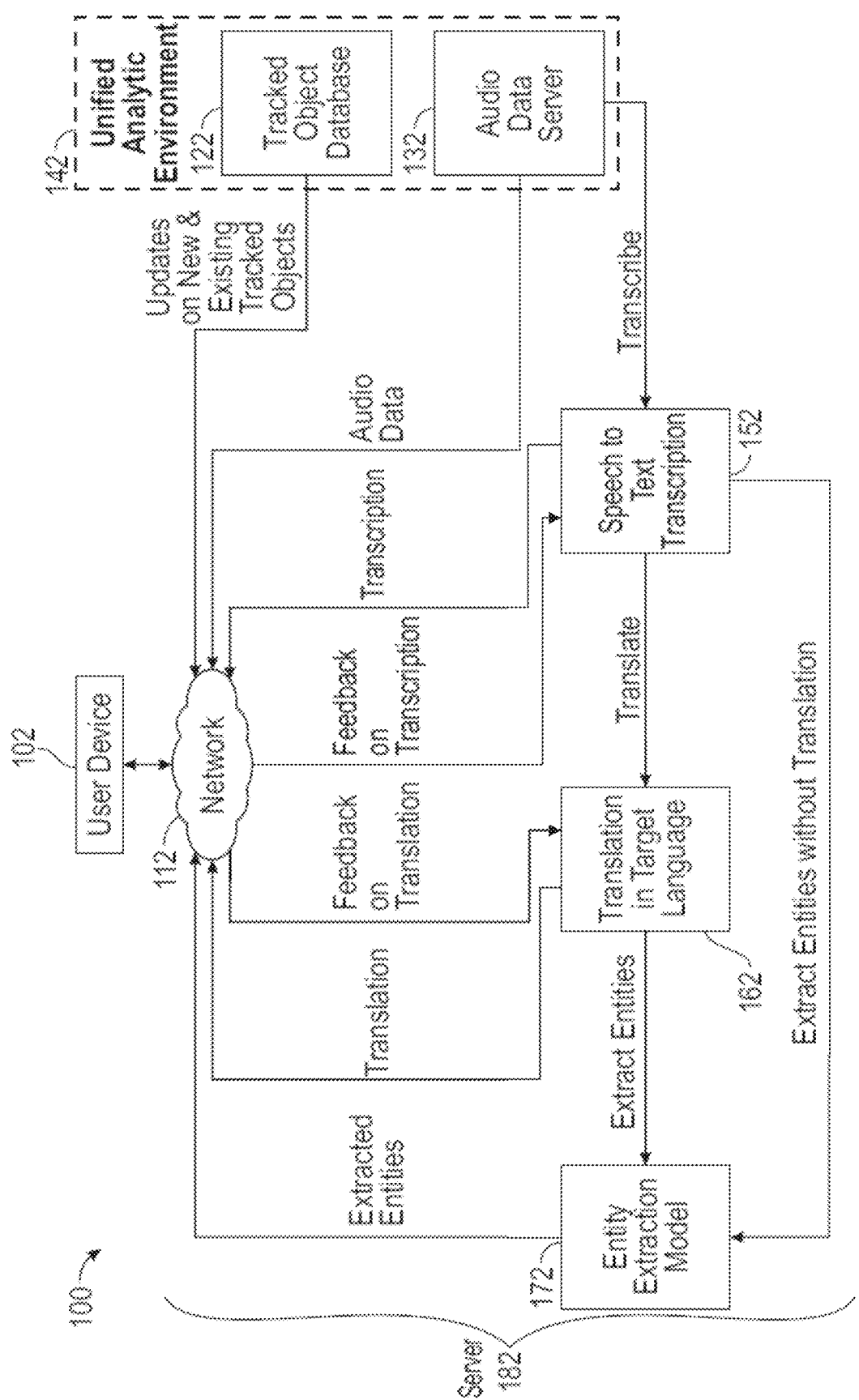
FIG. 1 illustrates a system and environment for handling numerous data files that can include audio.

Some organizations have access to large amounts of audio data that they need to process and analyze for critical information. This may be in languages not native to an analyst. Audio data from myriad languages and dialects is constantly queuing up, which may overwhelm the handful of available linguists and translators who create transcriptions and translations for analysts. Without proper transcription and translation, analysts are unable to analyze the foreign language audio data for critical information. For these reasons, a significant portion of foreign language audio data can remain unanalyzed. This can represent a massive audio processing problem.

Even if foreign language audio data has been transcribed and translated, analysts may need to manually triage each clip for mission-critical information. Analysts may be searching for relevant entities in the data (e.g., people, places, things, and concepts for future analysis). They may also desire to identify connections between entities and sort relevant from irrelevant information within the transcripts. This can represent a massive textual problem.

Similarly, when analysts are trying to piece together bits of critical information from many sources, analysts need quick access to critical information within transcriptions to verify their content, importance, relevance, etc. This may require that linguists and translators verify the transcription and translation of the foreign language audio.

The technical solutions discussed below enable analysis and management of large amounts of audio data (including in foreign languages), and exposing and using potentially mission-critical information contained therein. The described technical solutions streamline the process of triaging and analyzing foreign language audio data with a user-friendly interface embedded in a holistic analytic environment. Improved interfaces, database structures, algorithmic processes, and machine learning applications can be automated and combined, as described further herein.

When a computer system working within or creating a unified analytic environment receives foreign language audio data, a machine learning (ML) component of the computer system can create a corresponding foreign language transcript coupled with a transcription confidence score. Another ML component of the computer system can then translates the foreign language transcript into a target language transcript coupled with a translation confidence score. The target language transcript can then be analyzed by any number of entity extraction models. These entity extraction models can identify words that correspond to entities—people, places, organizations, things, and concepts identified in the audio file that may be of potential interest—and present some entities as suggested tags. The suggested tags can be approved by a user. Tags can create a link from an entity identified in the audio file to tracked objects (sometimes other entities or events, for example), which can be newly created or already existing. These tracked objects may represent important or mission-critical entities that are being tracked across a unified analytic environment. Additionally, the computer system can automatically identify and generate tags related to existing tracked objects in the target language transcript.

The computer system inside the unified analytic environment can include a user interface (UI) to help analysts analyze and manage foreign language audio data. An example UI contains modules such as a transcript viewer, an audio player, a panel for tracked objects and suggested tags, a translation feedback feature, and a visual graph of models applied to the data. The UI can provide user tools for analyzing (or confirming automated analysis of) foreign language audio data, identify potentially important entities, and provide inputs to generate alerts for new potential tracked objects. Similarly, the UI can allow the user to examine the automatically identified and generated tags related to existing tracked objects.

The UI can also allow a user to view and understand the underlying ML components that gave rise to viewed information and give feedback on those outputs (e.g., for better performance in the future or for correction of a translation, for example). The unification in a single UI of the ability to generate and present alerts, and listen to, read, and tag audio files and translated transcripts in a unified environment enables analysts to manage large quantities of audio data (e.g, in foreign languages). This computer system can address the massive audio and textual problems discussed above.

When new foreign language audio arrives in the computer system, an automated process can create a translated transcript. A user can then review and toggle between an artificial intelligence ("AI") and/or ML foreign language transcription and an AI and/or ML translated transcription. The user is able to view the confidence scores for the AI and/or ML transcription and translation services. These confidence scores can pertain to the processed audio as a whole or to portions thereof. Confidence scores can be provided and viewed for either the transcription, the translation, or both. The user is also able to submit both transcription and translation feedback directly to the computer system. This feedback can be: used for real-time improvement of processed outputs; stored for later use; used as a dataset for improvement of the AI and/or ML transcription and translation services; etc.

Using the transcripts, the user can tag entities (e.g., those mentioned within the transcript). This may generate investigative leads directly in transcripts that link to additional information on, linked to, or otherwise associated with that entity. Similarly, the computer system can also automatically identify and/or tag extracted entities based on tracked objects in other transcripts, flagged keywords and entities in the computer system, other entities assessed as worthy of tracking, etc. These new discoveries can be promptly connected to social network graphs, maps, searches for other entities, and reports within the unified analytic environment.

Through the audio player, the user is also able to listen to the audio file and see where it matches up with the transcript. The audio player also allows the user to visualize the audio waveform. The system can assist a user to, or automatically, identify individual speakers in the audio data. This can allow analysts and linguists/translators to use the same UI for verified translations of important audio material.

Disparate tools for audio analysis are difficult to use together effectively. Transcription of audio into visible text is often not automated or results in poor accuracy and trust. Translation of text from one language to another is often not automated, slow, and can also result in poor accuracy and trust. Verification of any processing steps can be slow and difficult. It can be difficult to select from or evaluate use of various ML models for any automated audio processing. Moreover, underlying data within the audio files may be difficult to locate, track and associate for analysis. Searching within processed audio data can be painstaking and ineffective. Multiple names, pronunciations, acronyms, aliases, pronouns, etc. can be used without clear definition or association. The provenance and reliability of data (both before and after processing) and underlying information within that data can be difficult to assess or track. These problems are compounded when data is voluminous, sources are disparate, and analytical resources are limited.

Described solutions show how various processing (e.g., ML) steps can be combined in time and/or space, how automation can be integrated and provide for feedback loops, and how proximity (e.g., through a UI) can facilitate timely analysis steps. Rapid audio processing, improved presentation of results and inputs, integration of feedback tools, etc. can thus create a unified analytic environment. Relevant information that otherwise would have been impossible to extract, identify, or understand can thus be extracted, tracked, and analyzed. The system can improve trust, understanding, and usage for all types of data (including those that include audio like video files). Patterns within the data can be automatically identified, used, stored, and/or highlighted.

The described solutions can incorporate a processing backend that incorporates commercial, open source, government AI and ML algorithms for transcription, translation. This backend can communicate with a frontend that provides a user interface. The frontend can allow users to read a transcript, listen to the underlying audio file, and/or provide tagging and alerting workflows. The tagging and alerting can integrate with an analytical database tool that uses graph and node functionality to help track or analyze events, entities, and relationships. The described solutions also provide for feedback from frontend applications to one or more backend applications, which can in turn improve the processing pipelines or any of the other described results or systems.

A system for automated processing and analysis of audio files can be established for large data sets in a cloud environment. A unified analytic environment can integrate audio machine learning models for processing and analysis with a knowledge management system, including graph presentations of tracked entities, linked to audio files and/or associated translations and transcripts. Entities within such data can be searched or filtered and proposed for tracking, or identified as tracked objects. These features can allow triage and prioritization of audio files for analysis. User interfaces can facilitate feedback on transcription and translation outputs, thereby improving present outputs and future inputs and outputs. Entities speaking or referred to can be found, tagged, and distinguished in audio files (e.g., using speaker identification in audio files, text searching in transcripts, etc.) Users can provide feedback and input on various aspects of a system, to enhance or adjust initial automated or other machine learning outputs.

An audio analysis application such as described herein can streamline the process of triaging and analyzing foreign language audio data with a user-friendly interface embedded in a holistic analytic environment. Such an application can contain a transcript viewer, an audio player, a panel for extracted entities, a translation feedback feature, and a visual graph of models applied to the data.

In some embodiments, users can do one or more of the following: (1) receive automatic alerts for keywords and tracked entities present in transcripts; (2) rapidly (e.g., instantly) toggle between translated and source language transcripts; (3) tag automatically extracted entities-including people, places, and organizations-to generate investigative leads directly in transcripts that link to additional information on that entity; (4) listen to an audio file, visualize waveforms, and identify speakers; (5) submit transcription and translation feedback directly in the application, which can be stored as a dataset and used to further improve upstream pipelines; (6) view AI/ML model confidence scores directly in an audio transcript to assess output quality; and/or (7) immediately connect new discoveries to social network graphs, maps, searches for other entities, and reports within a unified analytic environment.

Some embodiments can incorporate acoustic fingerprinting-a speaker's unique audio signature-in order to tag speakers and generate investigative leads based solely on voices in the audio file content. Some embodiments also or alternatively deploy natural language processing (NLP) and natural language generation (NLG) AI models to the audio data and expose the outputs in the audio application. The former produce analytical insights like sentiment, while the latter produce automatically generated summaries of transcripts.

EXAMPLES

FIG. 1 shows a system 100 that can provide a unified analytic environment for handling numerous data files that can include audio. A user device 102 can communicate with a network 112. A server 182 can provide some or all of the functions described in this figure. The server 182 can be located in a cloud computing environment and can comprise multiple processing modules that may be located together and or separately within the cloud or network 112. A unified analytic environment 142 can comprise a tracked object database 122 and an audio data server 132.

A user can employ a user device 102 to communicate with the network 112 and obtain or influence data or other operations as described here. For example a user may attempt to access a large database of audio data. In response, and audio data server 132 can provide access to the audio data to the user device 102 through the network 112 as shown. The audio data can be stored in an audio database that may be separate from the audio data server 132. In addition to providing the audio data to a user, the audio data server 132 can facilitate or perform a transcription of one or more files within the audio data. The figure shows a transcribed step that results in a speech to text transcription 152. A transcription can be sent to the user device 102, e.g. via the network 112. A user device 102 can comprise a user interface that juxtaposes the audio data or a player for such data with the transcription.

The audio data server 132 can assist in locating a particular audio file, or it can provide a user device 102 with access to many audio files within a large database or combination of databases. The audio data server 132 can be configured to allow searching using various characteristics from the audio files, including entities, audio signatures, events, date, title, provenance, and other metadata. The attract object to database 122 and the audio data server 132 can work together to provide information to a user device 102. For example, a tracked object database can have information relating to objects or entities that occur within data accessible to the audio data server 132. A hashing process can connect tracked objects to locations for those tracked objects and/or related entities that may occur within the audio data accessible to the audio data server 132.

The tracked object database 122 can provide updates on new and existing tracked objects through the network 112 to a user device 102. These updates can be automatically provided or offered, or they can occur at the request of a user device 102. For example, a new object can be identified by a user through a user interface available on the user device 102. Creation or confirmation of a new tracked object can occur through review of a transcription, the audio data coming from audio data server 132, or through other tools, juxtapositions, and methods available in the unified analytic environment 142.

The audio data server 132 can employ one or more machine learning models to transcribe audio files. A user device 102 can be allowed to see, choose, or influence how a transcription is created, including by reference to one or more of the machine learning models available or deployed by audio data server 132. A transcription may be created using one model, then reviewed, analyzed, or compared using one or more additional models, in a serial process. Thus, combinations of machine learning models can be used together to improve the transcription. During this process, a confidence value can be assigned to some or all of a transcription of audio data. The confidence value can come from the machine learning model, for example. Confidence values can also be established by the audio data server 132 prior to or after input from one or more of the models. A user device 102 can see one or more of the confidence values, and association with a portion of the audio data or transcription to which they correspond.

The confidence value or values can be displayed dynamically, and can be interactive such that a user using a user device 102 can be allowed to review, improve, or otherwise use the confidence value. The value can also be improved indirectly by user interaction with the audio data, for example by accepting feedback from a user that is not specifically related to the confidence value but nevertheless improves the result. When a user provides specific feedback on a translation, the user's own translation of that portion can replace the output from the model, for example. Other subsequent users can be informed directly or indirectly that a previous user has reviewed or commented on a particular aspect of a transcription. Thus FIG. 1 shows that a speech to text transcription 152 can be influenced or received feedback on the transcription via the network 112. This can be received from a user interface on a user device 102. And audio data server 132 and oversee, coordinate, or otherwise provide processing power for the transcription feedback and scoring. A system server 182 can also or alternatively provide processing power to accomplish these functions.

In addition to the speech-to-text transcription 152, a server 182 can oversee or produce a translation, for example a translation in target language 162. The translation can occur after a speech to text transcription 152 is created. Alternatively, a translation and transcription may be created simultaneously, or a translation may be provided without passing through an earlier transcription phase. A confidence score can be provided for translation, similar to the confidence score and feedback process described with respect to the transcription 152. For example, as shown in FIG. 1, a translation in target language 162 can be provided through a network 112 to a user device 102. A user may endorse or disagree with one or more aspects of the translation. Thus an arrow shows that feedback on the translation can be provided from the user device 102 through the network 112. In some embodiments a network 112 is not situated between the user device and other aspects of the described system or server 182. Similar to the transcription feedback process described above, translation feedback can involve use of a dynamic confidence score, which can be viewed through a user interface on a user device 102.

The confidence score can be dynamic and interactive. It can be updated based on a level of scrutiny received or feedback provided with respect to one or more passages or audio files. Higher scrutiny can improve a confidence score. A user's qualifications to provide useful feedback on a translation for transcription can also be accounted for in any updates to a confidence score. For example a bilingual reviewer or certified translator can be given greater credence and can have a greater effect on improving a confidence score. A lesser qualified analyst may not be allowed by a system to improve the score in the same manner. Nevertheless, and interaction between machine learning outputs and review by a live person through user device 102 can improve confidence, and this can be reflected in one or more confidence scores or a hybrid thereof.

The translation into a target language 162 can result from or be facilitated by one or more sources that can include machine learning models. A translation model can use artificial intelligence, for example. Similar to the machine learning and feedback process describe above for transcription, a dynamic and interactive confidence score can be used in connection with one or more translation models that are used in serial, in parallel, and/or in different orders. A user device 102 can use a user interface to expose a user to one or more combinations of the outputs from these translation models. A machine learning process can involve the feedback from a user device 102 such that preferred models are presented more prominently or first in time, both in the transcription and translation processes.

Cognitive services models (e.g., licensed or incorporated from third parties) can be used to provide the audio processing in a plug-and-play approach. A favorite model or model source, selected model or model source, and/or multiple models or sources can be used. Standardization and normalization (e.g., field renaming or data or terminology translation and mapping) can be employed to fit outputs from varying third party or other sources into a standard interface to enable a plug-and-play approach. Thus, regardless of a model or model source, the same fields or outputs are rendered by a front-end application. One or more dashboards can be provided for evaluating model performance, as those models produce outputs. For example, a confidence score and/or a word error rate can be output from a model after a processing step to help evaluate a model's performance. A user can receive a transcript and provide positive (thumbs up icon) or negative (thumbs down icon) feedback regarding accuracy or other characteristics of an automatically transcribed text, for example. That feedback can be captured and rendered as a dataset within a backend application and used for a graph on a dashboard, or selection of models used (e.g., by default) or otherwise available. Thus, a unified analytic environment for audio files can use ML inputs and outputs, and collect and use feedback regarding those outputs to improve the ML inputs, thus improving over time with help from users. An audio application can thus be valuable in model comparison and valuation, establishing self-improvement feedback process. If this process is not supervised, it can represent an automated or meta-machine-learning approach.

During or after the transcription and/or translation of audio data, a server 182 and/or an audio data server 132 can be used to identify, extract, or evaluate entities that may be within the audio data or the outputs from a transcription or translation process. FIG. 1 shows how entities can be extracted, for example after speech to text transcription 152 and translation in a target language 162. Useful entity extraction can depend on the accuracy or reliability of the transcription and translation processes, but such entity extraction can also be undermined, if those processes are not fully accurate. Thus, entity extraction can occur on audio data prior to any processing as well. At any extraction can occur before during or after any of the described processing steps. Entity extraction can rely on outputs from a tracked object database 122. For example, attract object database can be used to automatically scan any audio data that is presented to a user device 102 through a network 112 for objects within the track database, especially for subsets of these tracked objects that are identified as relevant to a particular search or analysis, as maybe identified or chosen by a user through a user device 102. To facilitate this, he tracked object database can associate various forms of attract object together, such as for example associating various aliases, titles, or other characteristics of a particular entity together. A person maybe known for using a particular font, for speaking in a particular dialect, for using a particular bank or other service, for traveling and or communicating to and or from a particular place, etc. They attract object database can store an audio fingerprint of a person's voice, the sound of people who live around them, the sound of their vehicle, etc. Thus a tracked object database can associate various data points, which can include those present in raw audio files or extractable therefrom.

FIG. 1 also shows an entity extraction model 172 that can perform some or all of the processes described for identifying entities and/or objects within stored data, for example audio data. The entity extraction model 172 can be the result of an entity extraction process that follows translation into a target language 162. Alternatively, an entity extraction model 172 can result from entities extracted without translation, for example in a foreign language where a transcript uses foreign characters to refer to a particular entity. The extracted entities and or the entity extraction model 172 can be provided through a network 112 to a user device 102, and presented to a user through a user interface, for example. And to the extraction can be managed, controlled, viewed, etc. through and interface that is unified with the other processes disclosed in FIG. 1. For example, the same server 182 or group of servers or server modules that performs this function, can establish a unified analytic environment 142 that not only helps identify track objects and assess audio for related information, but also extracts new entities for potential new tracking within audio and associates entities and objects with each other as controlled and reviewed by a user device 102.

System Examples

Figure 2:
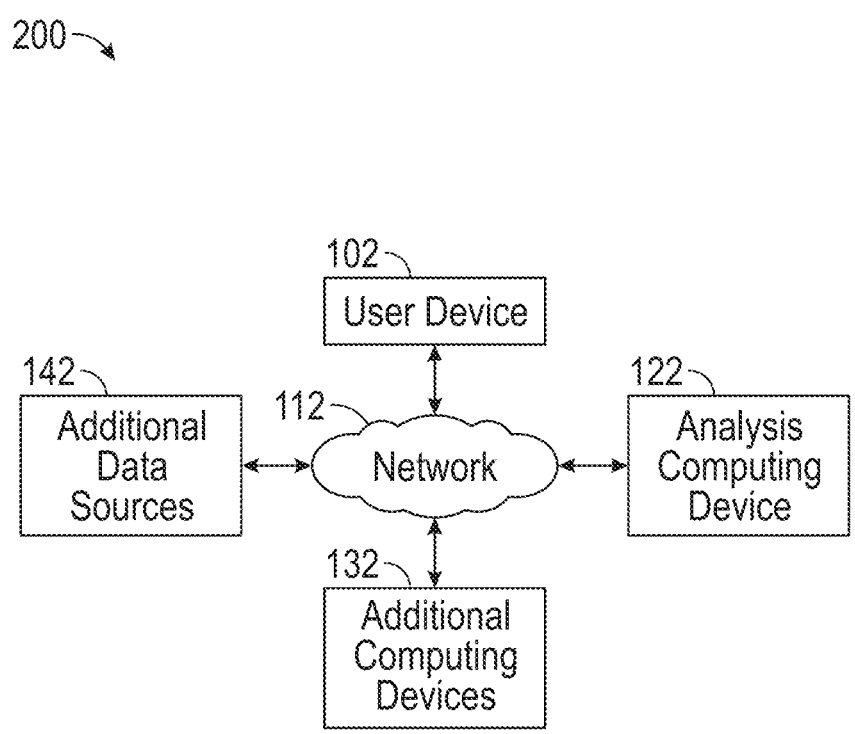
FIG. 2 illustrates how various devices can work together through a network to accomplish analytic functions for numerous files that can include audio.

FIG. 2 shows a system 200 that can perform the functions described with respect to FIG. 1. The network 112 of FIG. 2 can correspond to the network 112 of FIG. 1. The user device 102 of FIG. 2 can correspond to the user device 102 of FIG. 1. The system 200 of FIG. 2 illustrates how various devices can work together through a network 112 to accomplish the functions described above with respect to FIG. 1. For example a user device 102 can provide a user interface. Through that interface, information can be drawn from disparate sources such as the additional data sources 142. An analysis computing device 122 can be used to perform the processes described with respect to FIG. 1. Additional computing devices 132 can also be used and can interact with analysis computing device 122, for example. In some embodiments, the analysis computing device 122 can perform the functions described with respect to the server 182, the audio data surfer 132, and/or the unified analytic environment 142, all described in FIG. 1. The analysis computing device 122 can provide results to a user device 102 via a network 112. The additional computing devices 132 shown in FIG. 2 can provide some or all of the functions described with respect to the server 182, the audio data server 132, and or the unified analytic environment 142. And some examples, the additional computing devices 132 depicted in FIG. 2 can provide processing power used in a transcription and/or a translation process. Moreover, additional computing devices 132 can be used for processing in the entity extraction process that results in entity extraction model 172.

Thus, additional computing devices 132 may provide algorithms or services at one or more steps of the process described in figure one. The additional computing devices 132 can provide one or more machine learning models or applications thereof that can be applied to or process the audio data resulting in one or more speech-to-text transcriptions 152, and or one or more translations in a target language 162. Processing related to attract object to database 122 can also be provided by additional computing devices 132, and/or analysis computer device 122. Additional data sources 142 can be accessed or used by any of the other objects described and figured too, including for example the user device 102, the analysis computing price 122, and or the additional computing basis 132, all of which can occur via a network 112 or a user device on 02 can also interact with these other devices and sources more directly or in some other manner. Additional data sources can provide inputs or feedback to or from the transcription translation or entity extraction processes describe with respect to figure one. An additional data source may provide connections between entities, glossaries for translations, audio fingerprints, relational databases, hash files or other association means, etc. A cloud service can include translation and transcription services, and can be represented by the analysis computing device 122. Such a device can generate a user interface that is then displayed on a user device 102. Interaction between the analysis computing device 122 and user device 102 can occur via a network 112, and can involve two-way communication and control. Additional computing devices 132 can be controlled or provided by third parties and can include alternative or additional machine learning models which can include translation and/or transcription services.

User Interface, Function Examples

Figure 3:
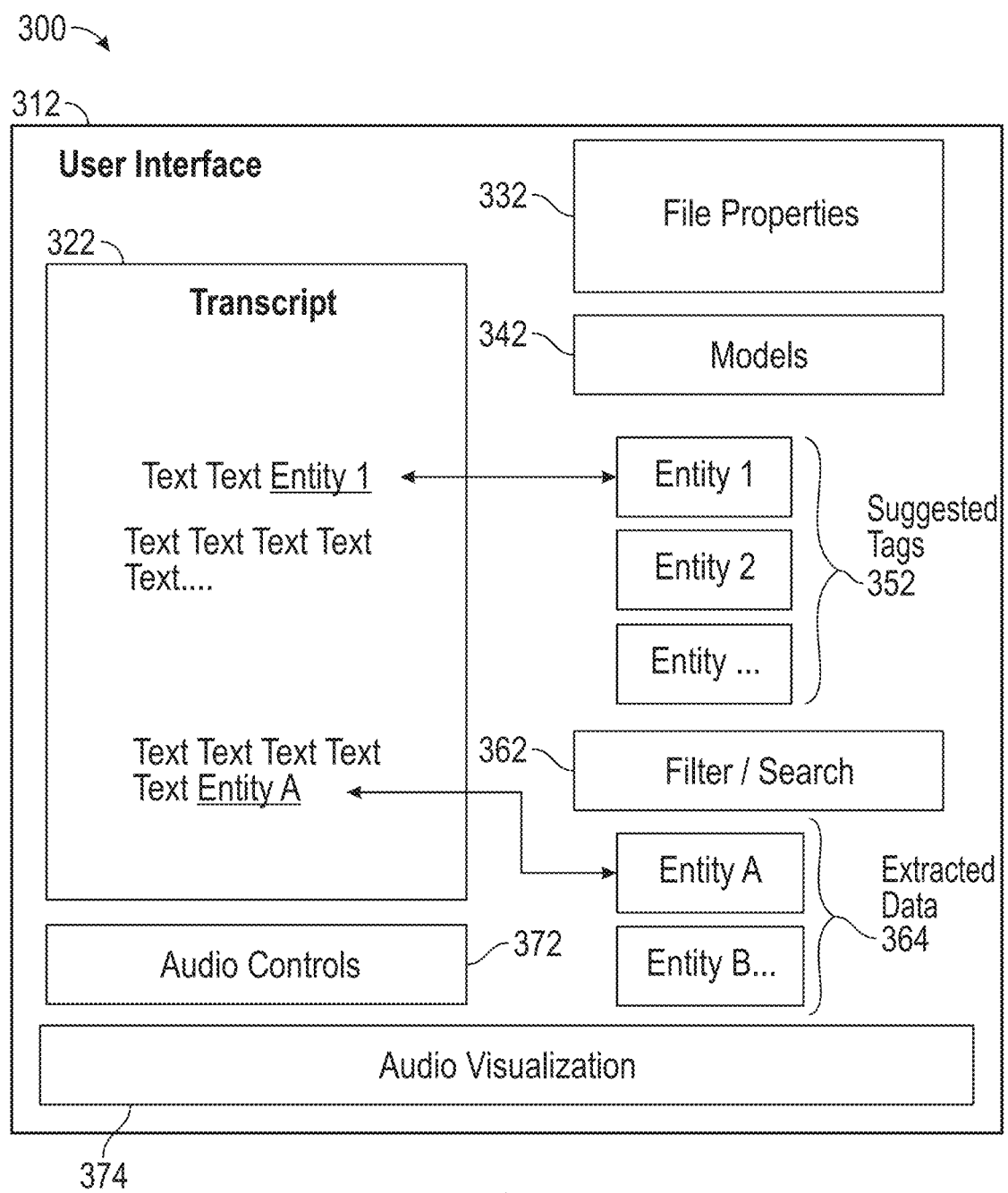
FIG. 3 illustrates an example user interface for a unified analytic environment.

FIG. 3 shows a system 300 that can provide an example user interface 312. The system 300 can include various modules or interface elements. For example it can provide file properties 332, models 342, suggested tags 352, a filter/search function 362, extracted data 364, audio controls 372, audio visualization 374, and/or to transcript 322. These modules can be juxtaposed in a single user interface 312. Each of the modules can comprise its own interactive user interface functionality. For example a user can simultaneously view a transcript 322 as well as file properties 332 for that transcript. Live links can be provided in some or all of the modules or interface elements depicted in the system 300. These live links can comprise the modules or interface elements themselves, or they can comprise portions of text or other representations within a portion of one of these modules. The arrangement of modules for visual units shown in the user interface 312 of the system 300 and FIG. 3 are merely an example and many other permutations of one or more of these modules are contemplated here under.

Correlation can be visually shown between aspects of the elements in the user interface 312. For example a text within a transcript 322 can correspond to extracted data 364 as shown by the arrow between entity a within the transcript 322 and entity a within the extracted data 364. Similarly entity one within the list of suggested tags 352 can correspond to a portion of the text within the transcript 322 as shown by the arrow between entity one and entity one.

With further reference to FIG. 3, various modules as shown correlated through user interface 312 here can correspond to a single file, for which the file properties 332 can be shown. Thus, a particular file can be analyzed using the modules shown simultaneously in a single user interface 312. Advantageously, a large portion of the user interface 312 can be used for providing a transcript 322 that can be produced as described in FIG. 1, for example. The file can be an audio file corresponding to the audio data from the audio data server 132 of FIG. 1. The transcript 322 can correspond to the speech to text transcription 152 of FIG. 1. If the audio file is in a foreign language, the transcript 322 can correspond to a translation in a target language 162 as shown in FIG. 1. The entities listed as suggested tags 352 and/or extracted data 364 can correspond to the extracted entities illustrated in FIG. 1 and corresponding to entity extraction model 172. Thus, the various processes and functions describe with respect to FIG. 1 can result in a user interface presented on a user device 102, and that user interface can include the modules or aspects depicted generally in FIG. 3. Multiple modules of any type depicted in the user interface 312 can be included. For example, models can be used to process audio data at more than one step, as described in FIG. 1. Thus, a models module 342 as shown in the user interface 312 are duplicated for a transcription and/or a translation process. Similarly a models module 342 can also be provided for entity extraction. The models module 342 can comprise a drop-down menu allowing a user to select which model is used to generate a transcript 322 in a transcription and/or a translation step. Alternatively or additionally, a models module 342 can be used to determine which suggested tags 352 are provided on the interface 312. Similarly, different models can be used and or controlled by a models module 342 for a filter/searching functionality. Thus the filter/search 362 candy penned on which or how many models 342 are selected for use by a user through the user interface 312. This can be similar to a user selecting which search engine is used for a web browser, but with the benefit that the search engine is apparent within the user interface 312 and can be selected and/or changed or combined via a convenient user control that can be represented by models module 342.

The user interface 312 can allow the different interface modules to interact and correlate the data within them. For example the transcript 322 can have a cursor or other indicator within a text portion that corresponds to a cursor or other indicator within an audio visualization 374 of the same transcript and/or transcript portion depicted in the transcript 322. A window can show the transcript 322 or a portion of a larger text, and a similar window and we provided in the audio visualization 374, or a box can be shown within a larger data string representing the entire audio file within the audio visualization at 374, and a cursor can move through the lateral visualization at the same time that a corresponding cursor moves through a transcript 322. Thus, cursors and windows can be used to correlate the transcript 322 with the audio visualization 374, and or a portion thereof that is being reviewed or analyzed. The audio controls 372 can be used to control one or both of these processes, and can include a speed of read-back or scrolling selectable by a user through the user interface 312. For example, a user may be able to press play in the audio controls 372, and this can simultaneously cause the transcript 322 to scroll to show the same text in the audio file as it appears in the transcript 322. Another example of module correlation is the suggested tags 352, which can dynamically change depending on which entities are currently present within the visible window of the transcript 322. For example, when entity one is shown in the transcript 322, entity one can also dynamically appear within the list of suggested tags 352 on a different but juxtaposed portion of a user interface 312. Selecting entity one on a transcript 322 and have the same function or interface effect as clicking on entity one within the suggested tags portion 352 of a user interface. Similarly, as entity a scrolls onto the visible screen within transcript 322, entity a can appear in an extracted data field 364. Alternatively, the entities listed within extracted data 364 or suggested tags 352 can correspond to other controls, for example a filter/search 362 or a models module 342. The visualized material, controls, and correlation between them for allowing an analyst to efficiently review the material associated with a file such as an audio file can be presented and/or used within a unified analytic environment. Such a unified environment can be presented and/or used visually such as is shown in this user interface 312.

A models module 342 can provide a drop-down menu, for example, that states a number of models applied. Selecting this drop-down menu can reveal alternative entity extraction models that can be used. For example, reg-ex pattern matching can be used to find a configurable pattern.

A suggested tags module or aspect 352 can apply entity extraction models on a translated transcript. This can identify people, places, organizations etc. using any desired model. This allows a user to discover leads that might not have been found otherwise. The models module 342 and the suggested tags module 352 can be related in that a model can dictate the suggested tags listed, and selecting a different model can provide a different (or at least differently generated) list of suggested tags.

Suggested tag fields can allow a user to select or agree with a tag. For example clicking on a "tag" button can invoke an interface (e.g., through a pop-up window) that allows a user to create a tracked object based on that entity. Thus, the unified analytic interface can unify audio analysis and knowledge management functions. This can create an "object" within a knowledge management platform. This can also mark it as a tag that has been accepted by a human. This can save the user's agreement to provide further enhancements to a backend pipeline in background feedback process. This can also change the color or other appearance of a tag or entity within a transcript or elsewhere in the user interface 322. Agreement with a suggested tag can also remove it from a suggested tag list to allow a user to focus on not-yet reviewed tag proposals. In some embodiments, accepted suggested tags can be transformed into extracted entities, which move from on portion of an interface to another. For example, an entity can be listed within suggested tags 352 and then move to extracted data 364 (e.g., based on human input). The system can save a history of affirmative user interactions that cause these status changes or movements. The system can also create and save sourcing information (e.g., a rationale for the selection). For example, an extracted entity can establish a link that indicates that the entity is present in this particular transcript (e.g., is known or was selected as extracted data as a result of appearing in that transcript). A link can also be established (e.g., but not always exposed to a user through an interface) between the extracted data and the raw audio file underlying a transcript. The link or extracted entity can inherit the controls of the transcript. For example, if you need to be on Team A to see a transcript, you also need to be on Team A to know the identity of the extracted entity that is present in (e.g., known from or confirmed from) that transcript. A transcript can represent a record within a knowledge management system. Records can be immutable and intended as a representation of the output from a source. Extracted entities and/or suggested tags can represent objects within the knowledge management system.

An extracted data module or aspect 364 can evaluate translated text documents to identify words associated with items already being tracked (or previously searched or tagged) by a particular user, or as part of a particular analysis.

Hyperlinks or other indicators can be used directly within a transcript 322 as suggested with the underlining of Entity A and Entity 1 in the interface 312. The indicator can have different visual effects (e.g., colors, bold, font, etc.) to indicate different status or provenance. For example, suggested tags can have one color and extracted data can have another color. Selecting one of these highlighted portions of a transcript can automatically generate an object or lead directly within a transcript.

A cursor can be used to select (e.g., hover over) an individual segment (e.g., paragraph, clause, statement, etc.) of a transcript, which can indicate a confidence score for that segment. This confidence score can come from a pipeline and indicate how well a ML performed on that particular segment of text. A user or a linguist or translator can provide feedback and/or suggest a better translation to use. This translation can replace (e.g., immediately, or after verification) the displayed translation text for that user. This feedback can also or alternatively be incorporated into a backend application or service, which can in turn improve a pipeline for future ML performance, selection of models, customization for a user or investigation environment, etc.

In some embodiments, a unified analytic environment can designate a transcript, a translation, or a segment of text for additional review or verification by a linguist. Some users can be provided permissions change translations. Such permissions, for example, can be based on user credentials, reputation, or user ratings. Thus, a specialist can have audio or other segments flagged for them to allow them to triage, edit, or perform other tasks relevant to their expertise or role on an analysis team.

File properties 332 can include a file history. Selecting (e.g., hovering over) a file history portion of a user interface can show a user how a translated transcript was produced through a backend or pipeline process, including a list of models used. This can include multiple models and how they were used for one or more portions of a transcript or translation or entity selection model, for example.

An audio visualization 374 can include separate tracks, icons, or segments for different speakers or sound sources. For example, if an ML model is able to parse out background noise from a foreground speaker, parallel visualizations can be provided showing how those two audio sources proceed over time. In another example, if two speakers are conversing (and if a model can detect or parse this), a separate visualization (optionally also corresponding to an indicator in the transcript 322) can provide a user information on which speaker is speaking at a given time. The visualization can show two people making alternating sounds in a conversation, for example. Each can be associated with a separate track or row of data (e.g., in a segment or waveform), and a speaker or entity name can be used to label each track. This can incorporate speaker recognition models that can be applied to analyze waveforms, for example, for tagging of audio data in addition to tagging portions of transcripts. Thus, automatic diarizations and specific segments can be used as training materials for identifying a particular speaker's audio fingerprint for use elsewhere or to improve confidence scoring. These specific segments and can also be used to solicit feedback from users through feedback links and/or pop-up windows, if a diarization incorrectly or properly identifies an audio source or conversing entity, for example.

Voice activity detection can also be incorporated to identify which portions of an audio file are more useful to a user. For example, a model can be used to identify more relevant portions of a long audio data file (e.g., from a recording device that is not physically linked to an entity but which captures some incidental audio from that entity).

FIG. 4 shows an example user interface 412. This interface can have the features, properties, and benefits of the user interface 312 describe with respect to FIG. 3. At the top left of this figure is shown information for an audio source file ending with .wav. A transcript window 422 begins with an information bar stating that this transcript has been automatically derived from an audio file and translated in English. A hyperlink 424 can be selected to reveal a full providence. An example interface that can appear after selection of this hyperlink 424 is provided in FIG. 9. The transcript window 422 can include the transcribed text and various hyperlinks or other features allowing user to better understand the text or the information they're in in the context of a unified analytic system. In this example, in the paragraph beginning with the word Hermione, a call-out 482 provides access to four icons: an arrow indicating that the object should be opened, a graph icon indicating that the object should be added to a graph, a pencil icon indicating that a user desires to edit the underlying object, and a garbage can icon indicating that a user desires to delete the tag. Selecting the arrow opens a page having information specific to the particular selected entity (in this case, Jones). Selecting the graph icon adds Jones to a graph application (which can form part of a knowledge management system within the same analytic environment).

The graph application can help a user find links to the same entity elsewhere in an investigation, for example. Clicking the pencil icon can invoke an interface allowing a user to edit properties for that entity. Such an interface can include designating a property (e.g., a string), classifying the entity as a communication, contact info, a description, a document, financial info, identification, etc. Further classification categories or subcategories can also be used. The edit properties interface can also have fields for Value (here, Jones), Classification, Date/Time, a selectable tool for adding the object to a graph, and delete button, a save button, etc. If the entity is already an object, a garbage can icon can be used to delete the object (meaning the word or phrase, while still an entity, will no longer be designated as an object).

In another call-out 484, a word that is not yet tagged or highlighted can also be selected by a user. The call-out 484 shows the options that can be provided including to tag the selected word or clause as an object, tag it as a link, tack it as a property, indicate that it has been recently tagged, select existing tags, select multiple, or copy.

In some embodiments, tagging, entity selection, or object tracking can be specific to a particular version of a processed audio data file. For example, highlighting to indicate objects can appear in an English translation. Alternatively, designating an object in a translated version of a text can also designate the corresponding word or phrase in a raw or native transcription of the same file, and this parallel tagging can also extend (in some embodiments) to portions of an audio or other raw or source file. Alternatively, a user can use a tag in an English version to check the other underlying materials using the other tools (toggling, juxtaposition, synchronized scrolling, etc.) available in an interface such as those described here.

A portion of the transcript can be highlighted, for example when a cursor hovers above that portion, as indicated with a dashed outline around the paragraph beginning with the words "That Jones . . . " A confidence score 492 (here 77%) can be provided next to a portion of highlighted text. Granular confidence scores can be aggregated for a particular process to data file. The top right of this figure shows the word English with a drop-down arrow. A user can use a control similar to this to toggle between a transcript shown in a native language (e.g., a "raw" text) and a translated language. Confidence scores or values shown in a raw or source text can correspond to a transcription model's confidence. Thus, confidence scores or values can indicate the confidence of the most recent processing step resulting in the viewed output.

An example audio control bar 472 is shown here with a play button centrally located as well as rewind fast forward, 5 seconds, and other audio control buttons. An example audio visualization bar 474 is shown toward the bottom of the figure with a speaker identification portion located at the left, a waveform representing the audio running from left to right and indicators of time next to tick marks at the bottom of the interface. Although not shown here, a call-out can appear for a user to provide feedback when the user's cursor hovers over a confidence score for a particular text segment (e.g., using a thumbs up or thumbs down icon).

Speaker identification can be provided using colors or other interface approaches. For example, different background or text colors can be used for different speakers in a transcript interface. Similarly, an audio waveform can be presented in different colors for different speakers, and/or a different speaker can appear in a box such as the one shown at the bottom left of FIG. 4. This speaker can change depending on a position of a cursor tracking an audio position within the waveform, or multiple speakers can be listed in parallel, with the waveform being shown within a row corresponding to that speaker, as appropriate. If a ML model has incorrectly identified a speaker, a user can edit the designation by typing a different user name, dragging waveform portions into different rows, providing feedback within a diarization interface, etc. For example, a block of text or a waveform segment can be selected and a menu or other interface provided for a user to associate that block or segment with a speaker (or other sound source), for example, or to otherwise tag or label that section.

Entity Management Examples

FIG. 5 shows an interface 532 that can be juxtaposed with the interface shown in the example of FIG. 4. The interface 532 can provide controls and functions for managing control of entities within a knowledge management system. The controls and interface aspects of the interface 532 can be functionally linked with the transcript controls and tools shown in figure for associated with a transcript 422. A file history button at the top of the interface 532 can be clicked to reveal the provenance information and other processing that was used to create a transcript such as that shown in FIG. 4.

A share button can be selected to send information created from or visualized using FIG. 4 or 5 to another entity or system. Record properties can be shown for a particular audio file. This portion of the example in FIG. 5 can correspond to the file properties 332 discussed above with respect to FIG. 3. The record properties can provide metadata and other information identifying the providence and source of an underlying audio data file. A models interface 542 can provide functionality consistent with the description of the models module 342 in FIG. 3. In the example in FIG. 5, they drop down menu indicates that three models have been applied. Selecting the drop-down arrow can allow a user to choose and/or view the models.

A suggested tags portion 552 can provide the functions and features discussed above with respect to the suggested tags 352 in FIG. 3 for example. The suggested tags in this case are a liver angina which is an entity, a weekly voice author, also an entity, and the president, a third entity. Selecting a tag button can invoke an interface to provide additional data and create an object from a suggested tag. Selecting a reject button can cause a suggested tag to disappear from this list or move so that it is not featured in the same prominent position. A user's selection of a tag or reject button can be saved for future reference to improve a model or improve knowledge management for a given entity. In an extracted data section 564, function similar to those described with respect to the extracted data portion 364 of FIG. 3 can be provided. In this case, 2 entities, Mr. Jones and Ms. Lopez, are shown. If a user selects a tag button for the liver angina listed above, that suggested tag can become an extracted data entity that is then listed in the section 564 below. A search/filter toolbar 562 can allow a user to search within various data sets. For example, a search can be performed within extracted data and the results can be shown in the extracted data portion 564. An icon can be provided such as that shown to the right of the extracted data heading that indicates a user desires to view the extracted data in a graph format. Selecting this icon can provide a view of such a graph format.

Figure 6:
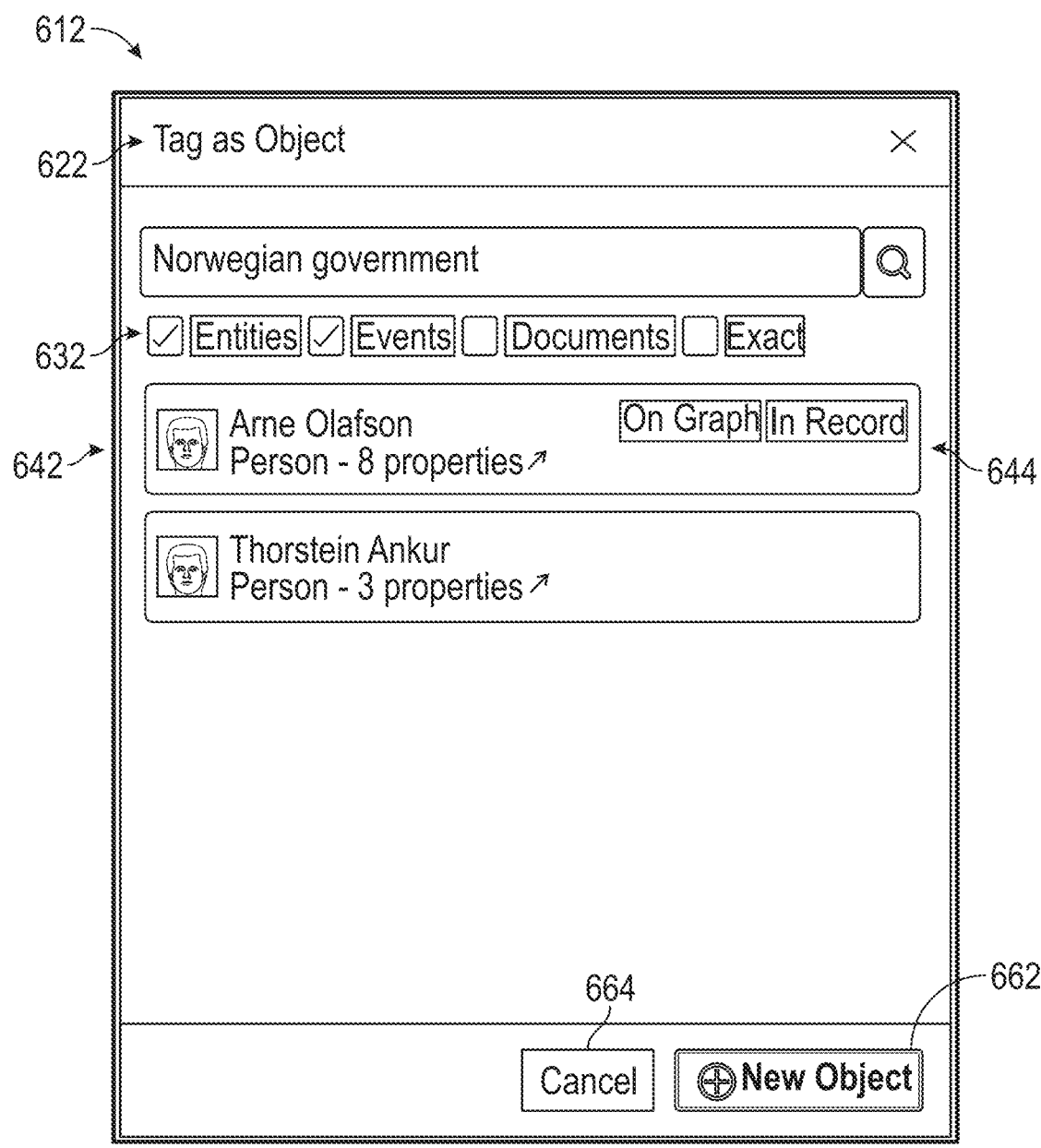
FIG. 6 illustrates a tagging interface and related functions.

FIG. 6 shows FIG. 6 shows and interface 612 for allowing a user to tag an entity as an object. For example, a user can select a word or phrase within a transcript and an interface can appear similar to that shown in FIG. 6. In an entity field 622, the words Norwegian Government are shown. This text can be automatically inserted into the search field when a suggested tag is selected from within a transcript or from within a suggested tag interface portion. In this example the words Norwegian Government have instituted a search and the results are shown in search results section 642. In this example Arne Olafson is a person as shown at the search result 644. The user can select Arne Olafson to associate that person with the Norwegian government, and this can occur on a graph or within a record as indicated by the buttons at the upper right-hand corner of the search results 644. Another search result which is not highlighted in this example is Thorstein Ankur, another person.

This interface saves time because a system does not require additional data input to establish the search function show the results indicated here. Simply clicking on a word within the transcript interface can result in the view of FIG. 6. Field selection 632 is provided underneath the search bar 622, and in this case the entities and events fields have been selected, but the documents and exact options have not been selected. At the bottom of the interface 612 is a cancel button 664 and a new object button 662. A new object button 662 is offered as an alternative to linking the particular text string to an existing object such as those indicated in the search results field 642. The search results shown in the interface 612 can result from text searching within object labels stored in a knowledge management system. In some embodiments, the search results shown at 642 can also include text searching within property values associated with other entities in the database. The interface can provide search results or suggestions to assist a user in avoiding duplication of objects. In this case, a new object button can be replaced with a different control button, for example.

A transcript can allow a free text search functionality, through use of a common control protocol such as ctrl-f. This can result in a text search within the transcript portion of the user interface. In this way, various instances of a particular object that appear within a specific transcript can be quickly located. These objects may not all be spelled the same way, because various aliases or spellings or titles of a particular entity can all be linked to a common object. This can avoid confusion, improve knowledge within a knowledge management system, and simplify a database and data structures. Thus human action and decisions in tagging can be solicited and recorded to improve later database structures and knowledge management by future users or the same user on different data files.

Figure 7:
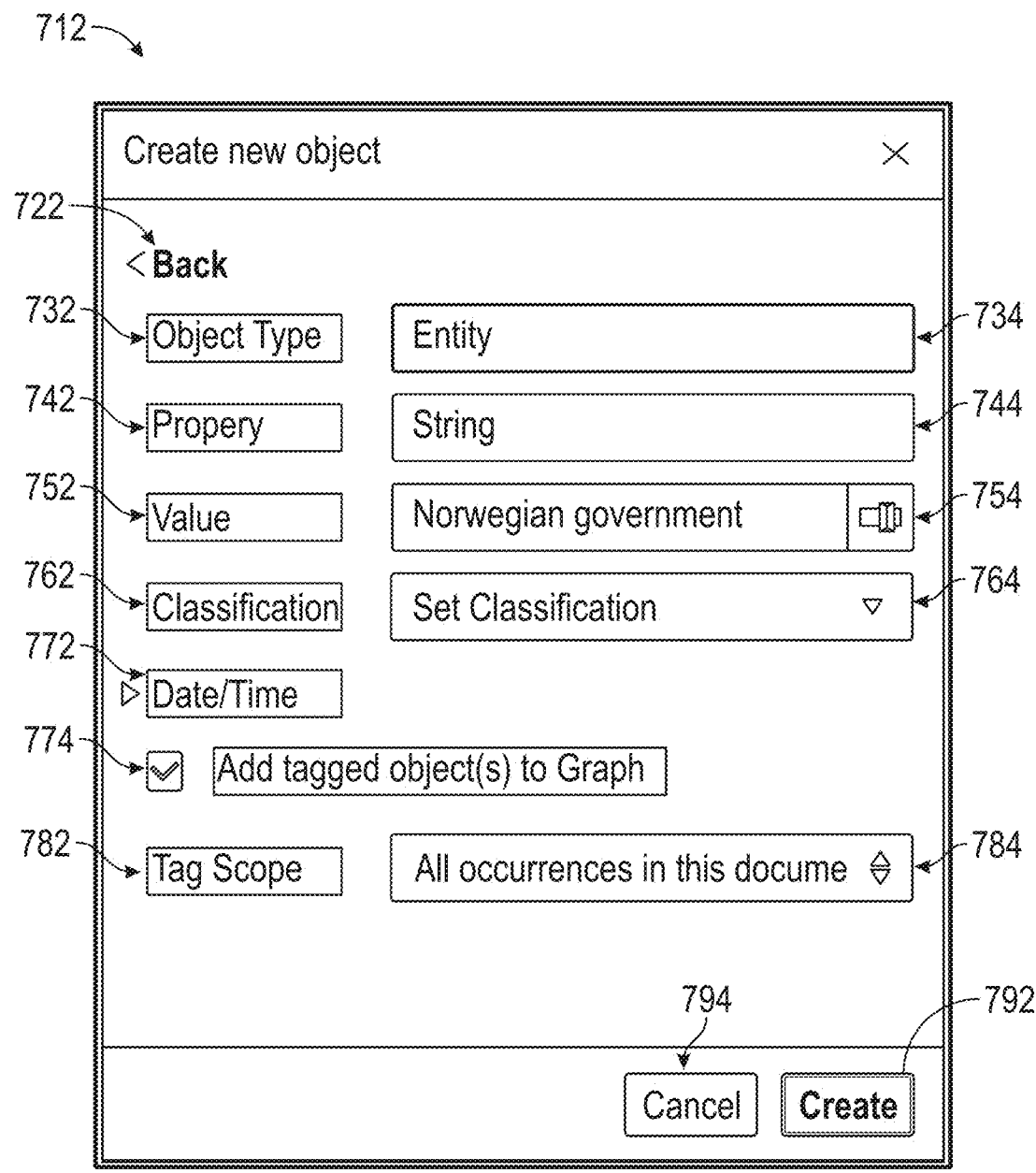
FIG. 7 illustrates an object creation interface and related functions.

FIG. 7 shows FIG. 7 shows a create new object interface 712. This interface can be presented as a pop-up window, for example when a user clicks on a word within a transcript. A back function 722 can allow a user to go to a previously viewed screen. And object type function 732 can be a button that allows a user to indicate what properties the new object should have. In this example the selected information is provided at 734 as an entity. A property 742 is indicated to be a string at 744. A value 752 is indicated as a Norwegian government 754 in this example. A classification 762 is provided with a drop-down menu 764, in this case showing set classification as a default value in that field. A date time field 772 is provided.

A checkbox 774 is provided for a user to select whether to add tagged objects to a graph. At 782 a tag scope is indicated to be all occurrences in this document 784, but other scopes are available with a scrolling menu having up and down arrows. A cancel button 794 is provided at the bottom of this interface, and a create button 782 can be selected after the values within the field shown above are agreeable to a user. This interface can be used for a newly identified entity that is found within a transcript or identified by a suggested tag feature. This can be an alternative to the interface shown in FIG. 6, which suggests that a selected word or phrase within a transcript may be associated with existing objects. Thus, if a user decides that a newly discovered entity does not belong with an existing object, the user can select the button new object 662 and FIG. 6, and the interface 712 shown in FIG. 7 can be displayed and used.

Trust and Feedback

Figure 8:
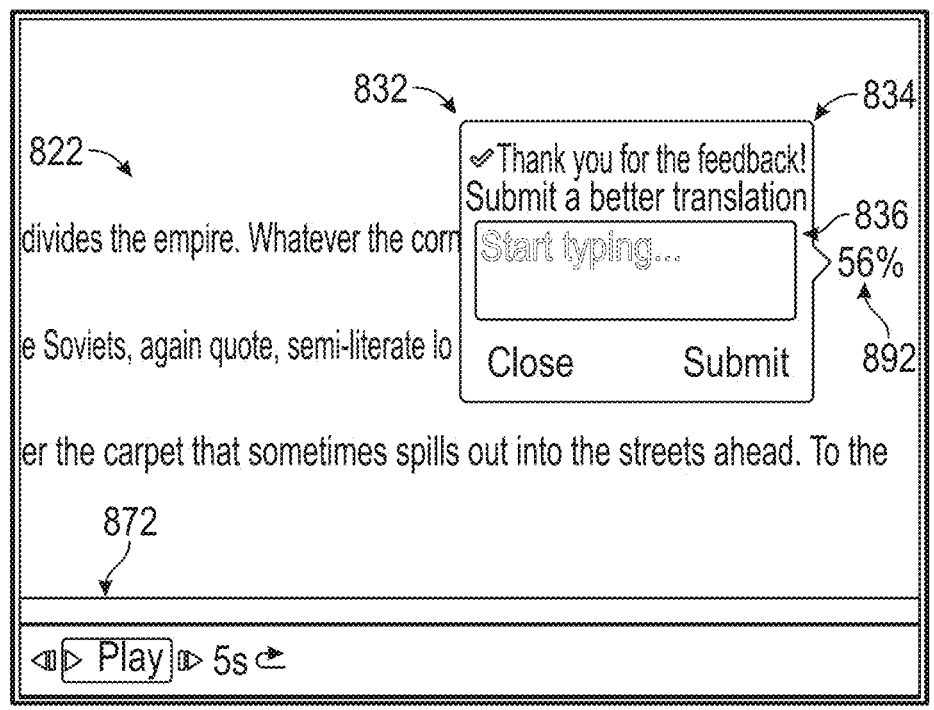
FIG. 8 illustrates a transcript feedback interface and related functions.

FIG. 8 shows how a user can interact with a portion 832 of a transcript 822. For example a pop-up window 834 can be shown in association with a portion of a transcript when a user selects a confidence score 892, which is shown as 56% in this example. A text entry box 836 can allow a user to provide feedback regarding the confidence score 892, which can be associated with a translation or portion of a transcript 822, for example. This feedback can be used to improve selection or algorithmic action by a translation model. When a user selects or hovers over the 56%, the pop-up window 834 can appear, which thanks the user for feedback and allows the user to submit a better translation in box 836. A playback control bar 872 is shown incidentally in FIG. 8. An alternative or additional feedback call-out can be provided that simply endorses or disparages a text segment confidence score (essentially saying the translation is bad or good, or better or worse than the score would suggest). The simplified call-out can appear when hovering, while the more detailed feedback pop-up window can appear when a confidence score is selected (e.g., by clicking on the field).

A unified analytic system can use feedback tools such as those described here to improve transcription or translation machine learning models or to establish a customized model for a particular user, data source, foreign language, investigation, or other grouping (e.g., within a knowledge management system). For example, a user may indicate a particularized translation for a word that is different from what the normal model would output for that word. In response to this manual feedback, the model can subsequently re-translate the text or a portion thereof (or use this information in subsequent translations). For example, it can prioritize particularized translations and prefer them over the standard output. This can be useful for an unusual acronym, nickname or phrase, for example, through a custom model specific to a particular user.

Data Provenance

Figure 9:
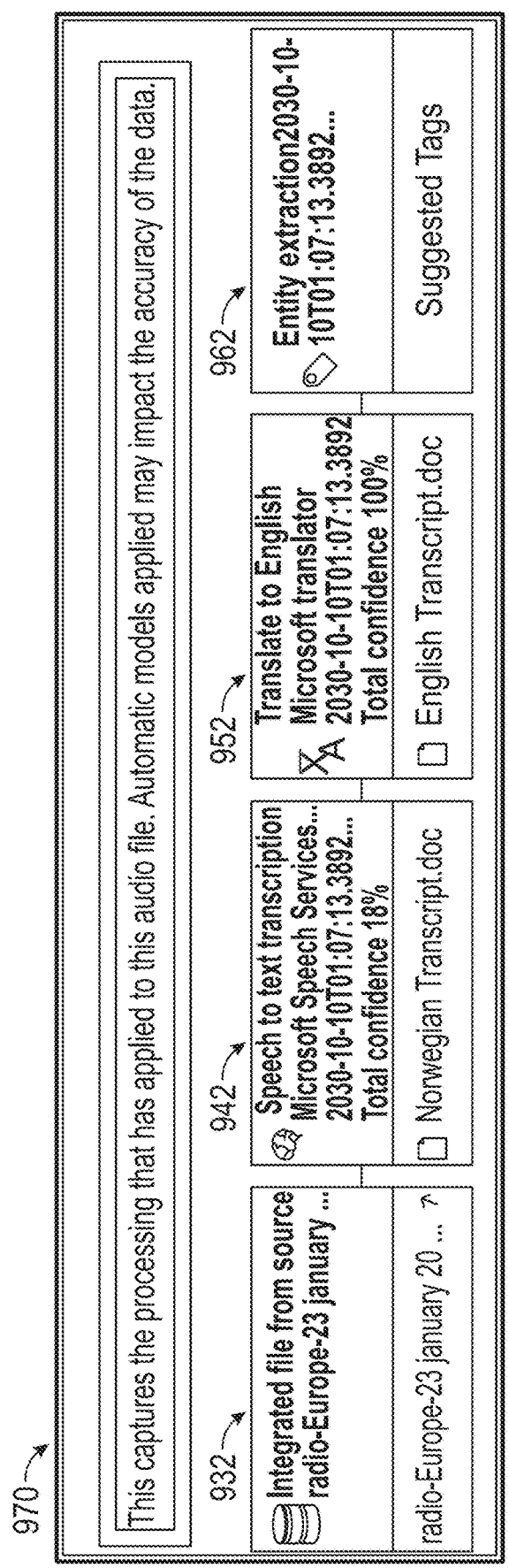
FIG. 9 illustrates an example interface for file provenance and history.

FIG. 9 shows an interface 970 that can result when a user selects the see full provenance link 424 in FIG. 4, or the file history link at the top right of FIG. 5, for example. This interface can provide a history of processing steps that have previously occurred for a particular audio data file. This example shows that an initial audio file was obtained from a source as shown at 932. Subsequently the data file underwent a transcription step 942. The interface shows that this step was performed using Microsoft speech services and this transcription resulted in a total confidence score of 18%. At 942, the transcription resulted in a file named Norwegiantranscript.doc.

Subsequent processing was a translation step 952. The material was translated to English using Microsoft Translator and the total confidence from this translation was 100%. At step 952, the English translation step resulted in a file having the name: Englishtranscript.doc. The final processing step shown here was entity extraction 962. This process resulted in suggested tags. In some embodiments, a user can click on any of the four processing steps shown here, in particular the material at the bottom of each box, to access either the integrated file from source 932, the speech to text transcription 942, the English translation 952, or the suggested tags. As noted at the top of this interface 970, the illustrated material indicates that this captures the processing that has applied to this audio file. Automatic models applied may impact the accuracy of the data. The models and services can be indicated in detail at each of the boxes 932, 942, 952 and 962. Note that the total confidence resulting from transcription at 942 is 18%, while the total confidence resulting from translation at 952 was 100%. The difference between confidence scores at different steps can be handled in various ways, including by aggregating, choosing the lowest score, taking an average, listing each score, or in various other ways. Each machine learning algorithm or other automated service or system can provide a confidence score. However, the scores may not be calculated or developed in the same way, and therefore may not provide a good comparison between one model and another. In some embodiments, the confidence score algorithms and underlying calculations can be normalized or otherwise adjusted such that in a unified analytic environment such as the one described here, the confidence scores or values can be more usefully compared or combined.

As shown in the interface 970, each of the steps can be associated with an icon related to that type of processing step. For example, obtaining an integrated file from a source 932 can be represented by an icon representing a database. Speech to text transcription 942 can be indicated with a brain icon. Translation 952 can be represented by an icon showing a translator's tools, such as a dictionary. Entity extraction 962 can be represented by an icon of a tag.

A pipeline maintainer dashboard can be provided that allows a user to select specific models for processing. For example, a preferred translation model can be selected (which may include customized terms or a customized glossary developed from previous feedback from that user or for a particular project or investigation). Such a dashboard can also indicate multiple user feedback (e.g., using a trendline) on results from various models, which can assist a particular user in selecting a most popular model, for example.

In some embodiments, a model can be switched midstream, changed in real time, a user can toggle between results from different models, or a user can see various combinations of results from different models. A user can also select a language on demand (e.g., from a drop-down menu), resulting in a promptly computed transcript or translation. A user can also select a series of translations (e.g., Norwegian→English→Spanish→Arabic) that may occur in real time or on demand.

Alerting Functions, Interfaces

Additional knowledge management functionality can be integrated with the user interfaces and system illustrated in these figures. In some embodiments, an audio application and/or interface as described herein can itself represent a unified analytic environment. In some embodiments, an audio application can be integrated into a larger environment that can comprise a knowledge management system. Such a system can be used for investigations and alerts.

In an example alert workflow, a user can begin on a knowledge management system home screen that provides live fields or links for: text search, a keyword search, a Wikipedia (or other knowledge base) search, a geosearch, a movie database search, etc. This home screen can also provide an alert module listing objects that have been selected by a user (e.g., people being tracked or followed), along with juxtaposed numerical indicators showing how many times those objects appear in the linked evidence, records or other source material. This module can include a search bar for searching within a long list of alert objects. The home screen can also include a feed update module providing new examples of an object appearing or moving (e.g., in the news, search results, newly linked or identified source materials, etc.) Various tabs or other selectable controls on or near a home screen can allow a user to access other views or interfaces within the same unified analytic environment. These can include interfaces or pages for: a browser, a graph, an object explorer, audio (such as the interfaced described herein).

Figure 10:
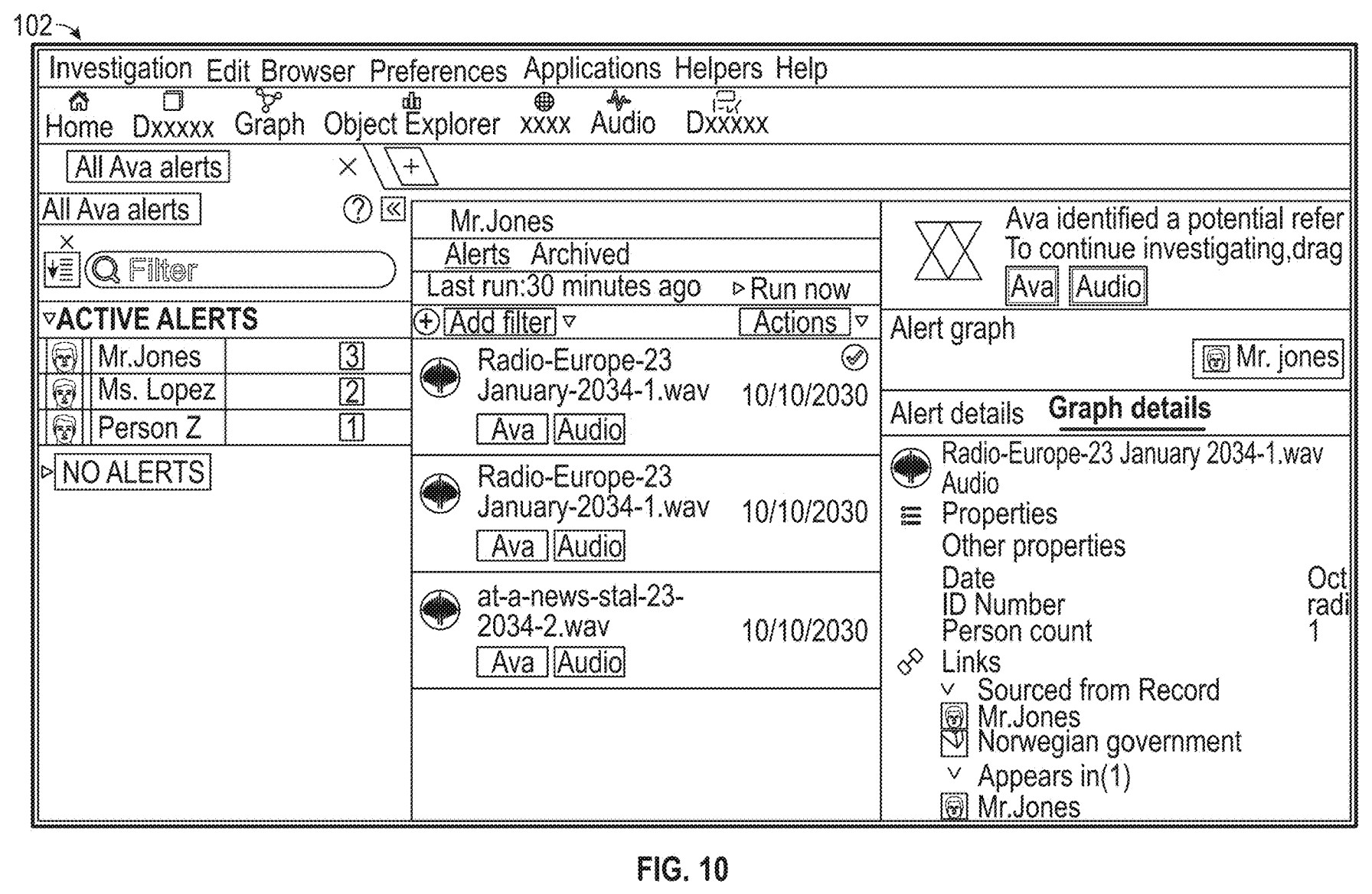
Figure 11B:
FIG. 11B illustrates an example graph details interface for an entity.

If a user selects a particular object for which an alert is established, an interface can promptly present an interface have features such as those of FIGS. 10 and 11A or 11B, for example. FIG. 10 shows an example detail portion of a knowledge management interface, and FIG. 11A shows a different detail view of the same example interface. FIG. 11B shows a detail view after the object link (Mr. Jones) in the Alert graph section has been selected.

At the top of FIG. 11A, a knowledge management system interface can indicate that an entity (here, also a tracked object, Mr. Jones) is referred to within a translated transcript corresponding to an audio file. From this interface, a user can click and drag the icon at the left directly into another screen, view, or window to load the transcript or related files for further analysis. For example, this dragging action can result in the interfaces and features described above with respect to FIG. 3 and FIG. 4. Alerting can help notify a user that tracked "objects" are present in one or more data files (e.g., audio files and corresponding transcripts). For example, a new transcription or translation can result in new alerts. Similarly, new alerts can be triggered based on speaker recognition or other audio processing analysis, in addition to or as an alternative to text-based alerts. An example tagging workflow to support this is, in FIG. 4, is to select a portion of the interface on or near the words "Unknown speaker 0" and request that this speaker be tagged or otherwise designated an object for tracking (e.g., using a menu such as the call-out 484 or an interface such as that of FIG. 6, for example). Additional tagging and tracking features can identify which speaker or entity stated the name or otherwise referred to a tracked object.

As these figures show, in some examples, a unified analytic environment can involve a browser functionality that is accessed through a tab interface. The browser functionality can provide a view of alerts corresponding to specific entities that have been designated as objects within the knowledge management system. Each object can be associated with an alert, and some can be active.

As best seen in FIG. 10, an active alert tab can be shown, for example at the left of a screen, and selecting an object in that active alert panel can reveal the various audio files within which that object appears or has been tagged. Archived and alert functionality can be provided within the knowledge management system. In a related screen for such a user interface, when a particular object is selected, the audio files associated with that object can be displayed in another screen or panel located next to the object and active alerts. Selecting a particular audio file in this interface can reveal a transcript and other details associated with that audio file and another panel that can appear side by side with the first two panels.

As best seen in FIGS. 11A and 11B, an alert graph can be provided linking the object and the audio file in a graphical manner. Thus in an alert graph that is part of a knowledge management system, the audio file illustrated in FIG. 4 can be linked to one or more of the entities, in particular the designated objects shown in FIGS. 4 and 5. A button can be provided in such a knowledge management interface that is labeled listen and few transcript. Such a button or other similar control can allow a user to toggle between the knowledge management system and the audio file analysis interface as shown in FIG. 4 and FIG. 5, for example.

In some embodiments, additional machine learning (ML) or artificial intelligence (AI) models can be applied in a serial processing manner. For example, summarization and/or natural language generation can occur after initial transcripts and translations have been generated. In some examples, a system can automatically apply or provide ML summaries of long audio files (e.g., a five sentence summary of what transpired in a 5 hour audio clip). This can provide an AI version of a "too long; didn't read," or "TLDR" summarization function.

System and Process Examples

Figure 12:
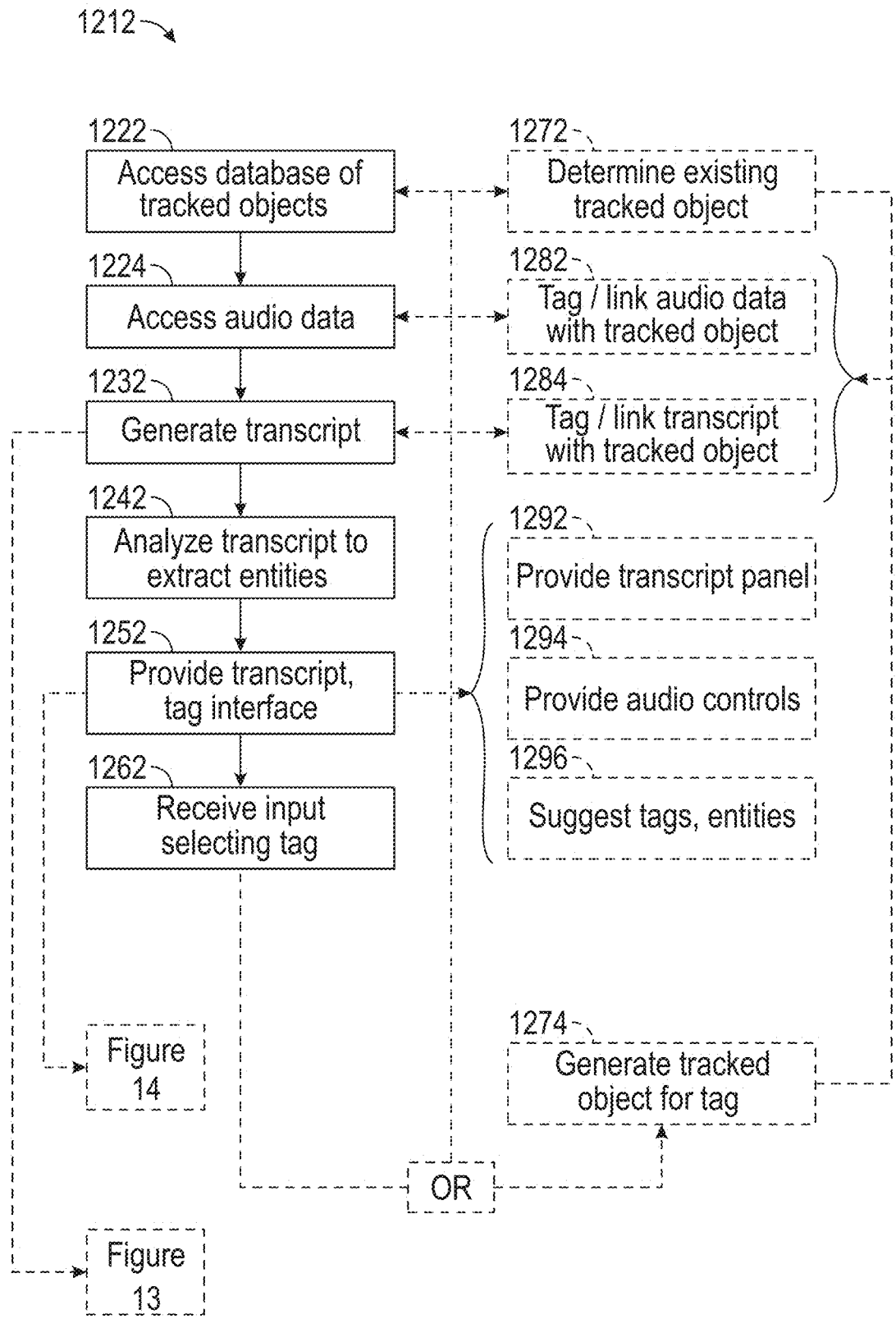
FIG. 12 illustrates method steps for computerized approaches to handling audio file analysis.

FIG. 12 shows an example method 1212. The method 1212 can comprise multiple processes that can be dependent or independent of each other. And a first step the method 1212 can access a database of tracked objects 1222. The method can then access audio data 1224. At 1232, the method can generate a transcript. At 1242 the method can analyze a transcript to extract entities. At 1252 the method can provide a transcript/tag interface 1252. At 1262 the method can receive input selecting a tag. At 1232 the generation of a transcript can be further described and explained given the additional processes and concepts described in FIG. 13. At 1252 the process of providing a transcript/tag interface can be further described with respect to the material in FIG. 14.

In some embodiments the process steps shown at the left hand side of FIG. 12 and depicted with blocks 1222 through block 1262 can be performed independently. In addition to these steps, or after them, additional steps can be performed. At 1272, for example, the method 1212 can determine if an existing tract object corresponds to a selected tag. This can be done by accessing or otherwise interacting with the database of track objects 1222. That's step 1282 the method can tag or link an audio data file with a tracked object. This can be done by accessing or otherwise interacting with audio data 1224. At step 1284, the method can tag or link a transcript with a tracked object. This can be done in connection with the generation or regeneration of a transcript, generally represented by block 1232. The method steps described at blocks 1282 and 1284 can be performed after the determining step shown at 1272. In an alternative pathway, after receiving input selecting a tag as shown at block 1262, the method can generate a tracked object for a tag as shown at block 1274, instead of determining an existing tracked object as shown a block 1272. The stuff shown at 1274 can be followed by the steps shown at 1282 and 1284.

At step 1292 a sub process can be provided where a transcript panel forms a portion of a transcript/tag interface 1252. Similarly, as shown at step 1294, audio controls can be provided as part of a transcript/tag interface 1252. As shown at step 1296 the transcript/tag interface 1252 can also suggest tags and entities. The functionality described and referred to in the method steps of FIG. 12 can be accomplished through a user interface such as that described with respect to FIGS. 3-9, for example.

Figure 13:
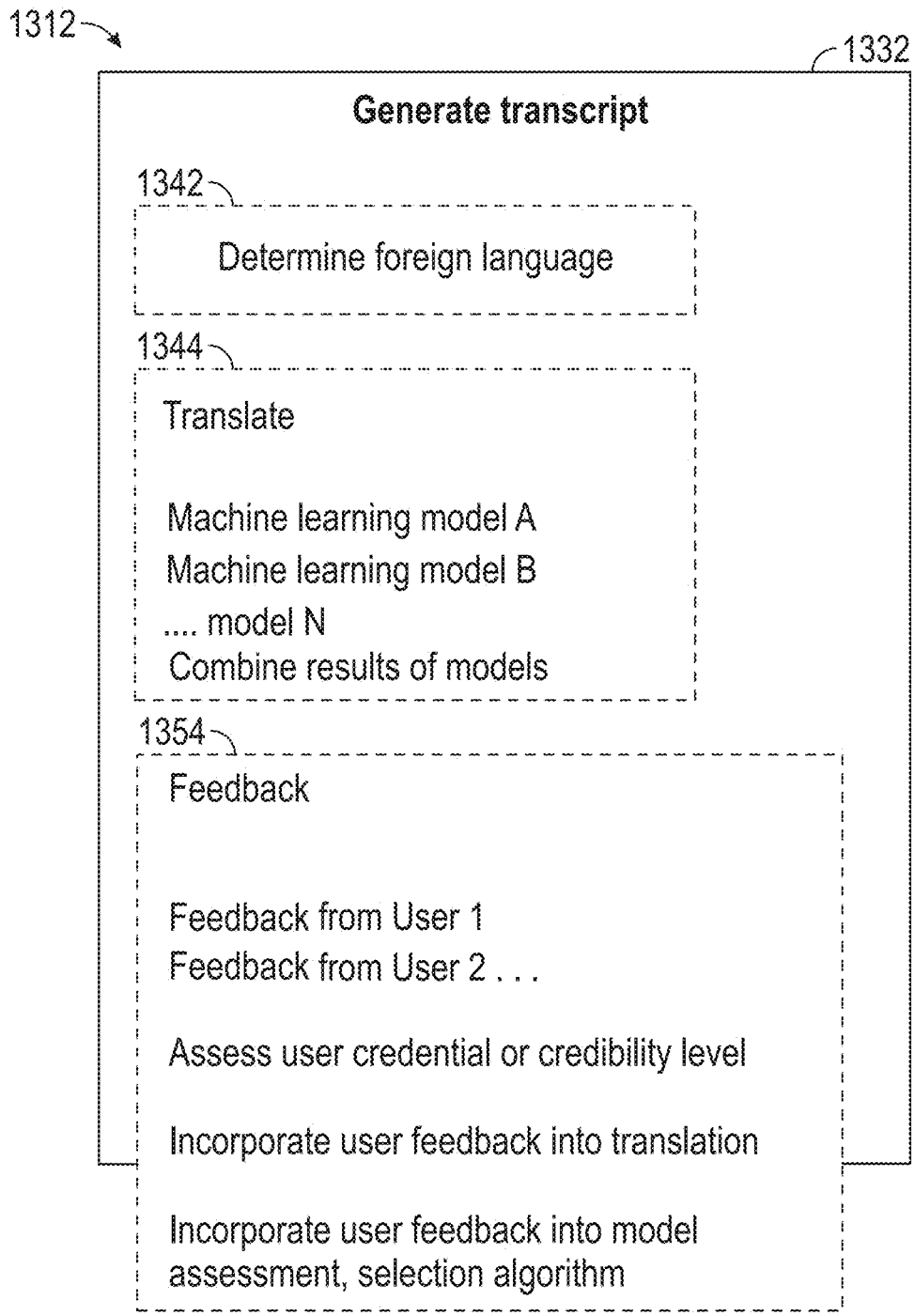
FIG. 13 illustrates how a system and process steps can generate a transcript.

FIG. 13 shows how the process 1312, which can include an interface, can be used to generate a transcript 1332. In some embodiments, has shown at step 1342 a transcript generation process can include a step of determining a foreign language. As shown at 1344, a translation process can involve multiple machine learning models such as model A model B . . . through model N. The translation process 1344 can include selecting and/or combining the results of one or more of the models A through N.

At 1354, FIG. 13 also shows how feedback can be incorporated into a translation process. For example, feedback can be collected from User 1 and User 2, in addition to other users. Feedback from any users can be used to update the transcript as part of the generate transcript 332 process. Alternatively or in addition, a user's credential or credibility level can be taken into account prior to incorporating feedback. The feedback can be used to update the transcript as shown to a user, and it can also be used to incorporate the feedback into a model assessment or selection algorithm. Thus if multiple users prefer translations sourced from a particular model, that can be the default or preferred model that is originally presented to future users, especially users that have previously preferred that model or those working on the same project. The feedback process 1354 can occur in real time or it can be used over longer periods of time to improve models or translation processes.

Figure 14:
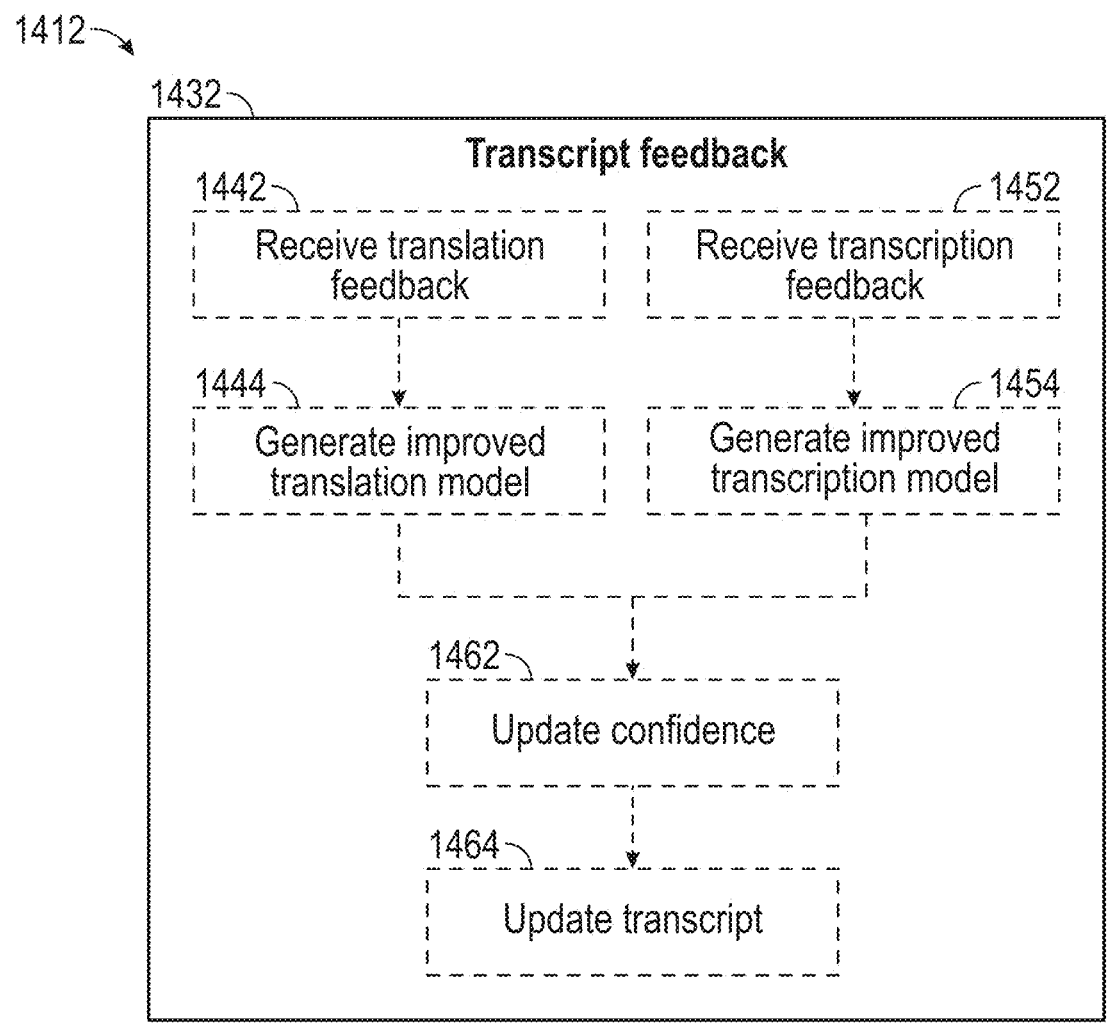
FIG. 14 illustrates how a system and process steps can be used for transcript feedback.

FIG. 14 shows representation of a feedback process 1412. For example transcript feedback 1432 can be produced using some or all of the steps presented here. At 1442 a system can receive translation feedback. At 1444 this feedback can allow the system to generate an improved translation model 1444. In a parallel or serial process, at 1452 the system can receive transcription feedback. That feedback can allow the system to generate and improved transcription model 1454. As described above, the translation and transcription feedback can also be used immediately or later to improve a translation or a transcription as presented to the user during or shortly after the time that the user provides the feedback for that particular transcript or translation. After a feedback process either for a translation or a transcription or both, the improved models can be used to update a confidence score as shown at 1462, and/or to update a transcript as shown at 1464.

As with the other process examples and figures in this disclosure, the method steps disclosed can occur in a different order than that described or depicted in these figures. Moreover, method steps are optional, even if depicted in a given figure. Steps and connecting lines shown as dashed lines are also optional or can depict alternative pathways or processes. The transcript feedback approach shown in FIG. 14, or similar feedback approaches, can be initiated using an interface directly on or associated with a transcript. For example, the transcript shown in FIG. 4 can have a live link at the confidence score 492. Hovering over that link can allow a user to approve or disapprove of the confidence score or of the result of the translation model. Clicking on the link for 92 of FIG. 4 can also allow a user to provide more granular feedback, including an alternative translation for some are all of the phrase indicated.

Figure 15:
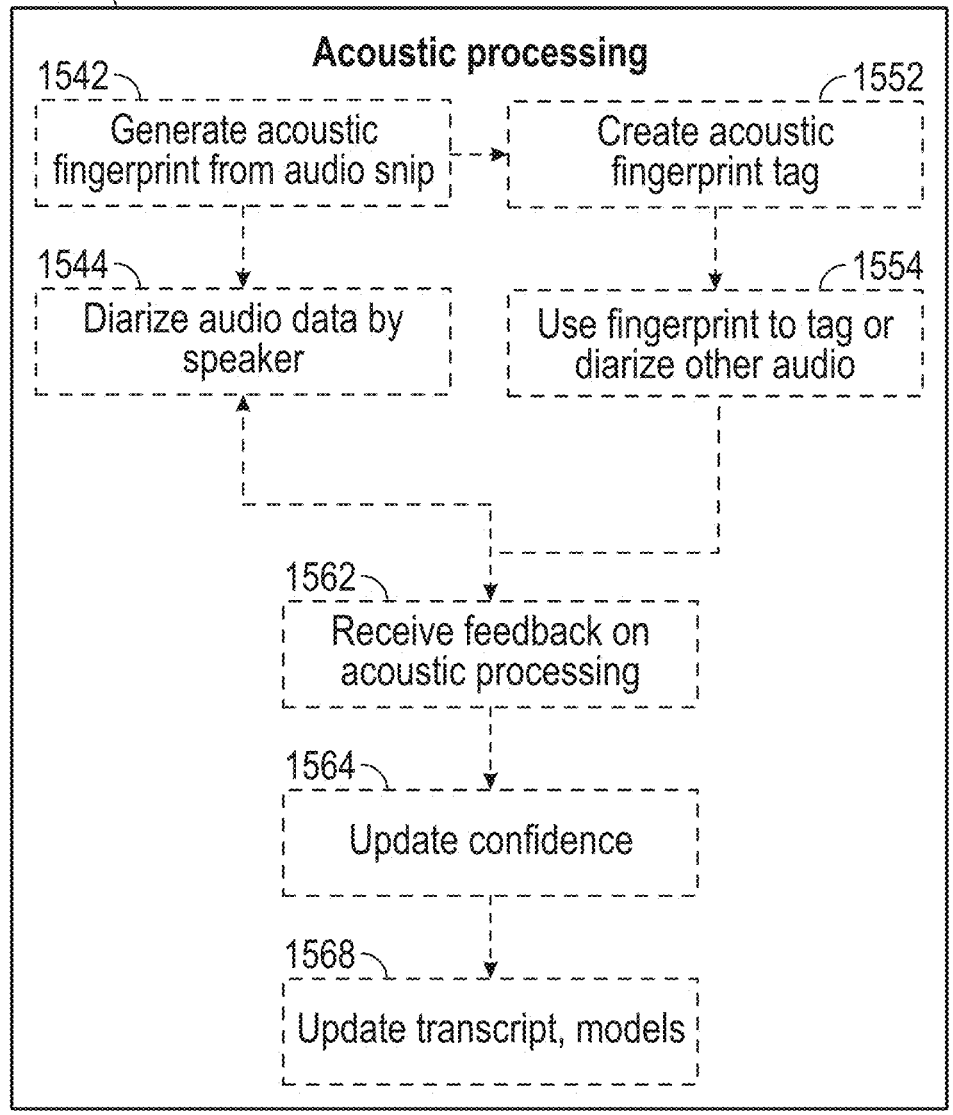
FIG. 15 illustrates how a system and process steps can be used for acoustic processing.

FIG. 15 shows a method 1512. The method can comprise various steps for acoustic processing 1532. At 1542 the method can generate an acoustic fingerprint from an audio snip. At 1544, that acoustic fingerprint and any others that may be generated from other audio snips can be used to diarize audio data by speaker 1544. Alternatively or additionally, as shown at 1552, the system can create an acoustic fingerprint tag. An acoustic fingerprint tag can be associated with an audio file or a graphical representation thereof to show that a particular portion of the audio data corresponds to a particular sound source. For example a speaker in a conversation can have a first fingerprint tag and a separate speaker in the same conversation can have a second fingerprint tag. Audio can be diarized by applying tags to alternating portions of the conversation showing that speaker one and speaker two are speaking alternately. At 1554, a method can use a fingerprint tag to diarise the same or other audio.

At 1562, a feedback system can be used for acoustic processing, including the processing resulting in the diorization or acoustic fingerprinting or tagging process. At 1564 a confidence can be updated as part of the feedback process, and at 1568 a transcript and/or models can be updated as a result of the acoustic processing and feedback.

Using Analyzed Audio Data

Figure 16:
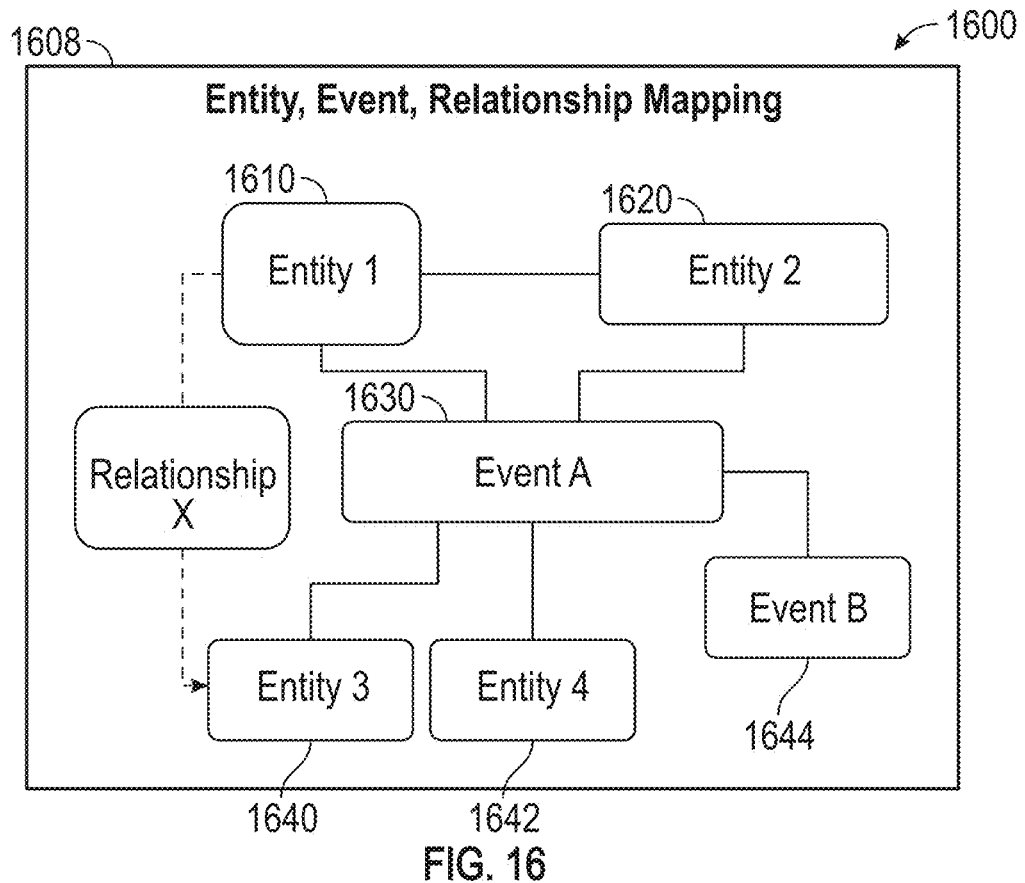
FIG. 16 illustrates how a knowledge system can associate entities, events, and relationships.

FIG. 16 shows a generalized schematic graph view 1600 (e.g., that can form part of a knowledge management system such as discussed herein. FIG. 16 shows how the audio system and methods described here in can be incorporated into or help produce visual outputs in a graph interface 1600 of a knowledge system. For example, not 1608, and entity, event, and/or relationship mapping interface can be provided. With such an interface, various entities events and relationships can be shown. For example entity 1 1610 is associated with entity 2 1620. Those two entities are also associated with event a 1630, as shown by the connecting lines in FIG. 16. Event b 1644 is also associated with event a 1630. Although entity two and entity four 1642 may not be related, they are each associated with event pay 1630. The graph also shows that entity 11610 and entity 31640 have a relationship x that links them separately from event a 1630. Graphical relationship map such as this one can be used to organize thinking in a knowledge system and can be very useful for investigations, for example. If audio data is available for Event A, entity one may be speaking at Event A, and this fact can establish the link between Event A and Entity 1, as shown. Similarly, if phone data exists for phone calls between entity 11610 and into 31640, this can establish a Relationship X, as shown. Thus in a graph view or interface, the relationships shown here with connecting lines can be associated with audio data files, transcripts, translations, etc. Similarly, if Event B 1644 is mentioned at or during Event A 1630, this establishes a link between the two as shown by the connecting line between them in FIG. 16. Thus, audio data can be used to great effect in providing evidentiary or investigatory links in a unified analytic environment for aiding knowledge management.

Systems and methods such as those described here can be particularly useful to help users triage many (e.g., hundreds or thousands) of audio files to identify relevance or otherwise prioritize material for further analysis. For example, upon automated transcription and translation, a system can search within or present for prioritized review those audio files having the most, or the most relevant hits on a particular tracked object. The system can sort and order the materials based on relevance, date, number of hits, status, recency, etc. (and/or some combination of these properties). Tagging features combined with automated machine learning models and search functions help prove these benefits. This can save many hours of processing time to surface the audio files having tracked objects.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 17:
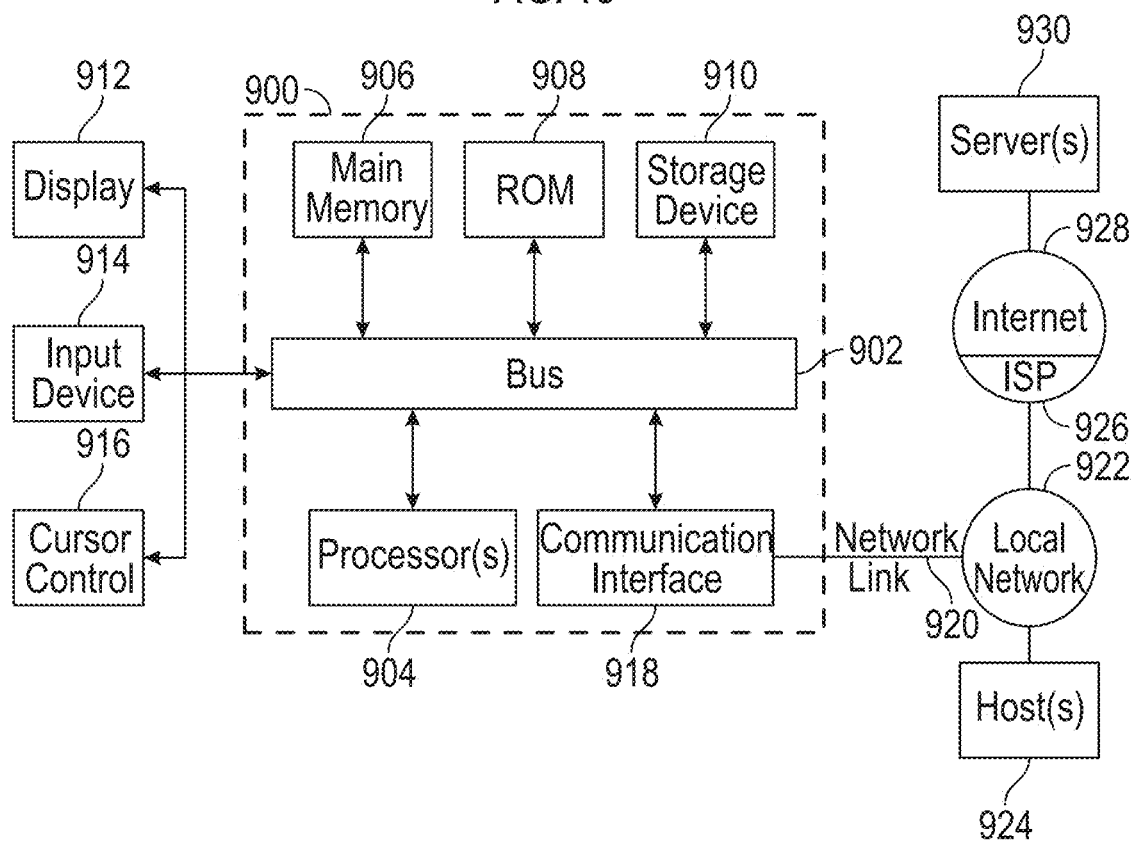
FIG. 17 illustrates a computer system with which certain methods discussed herein may be implemented.

For example, FIG. 17 is a block diagram that illustrates a computer system 900 upon which various embodiments may be implemented. Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicate with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

The features described herein can be implemented in a remote or distributed computing environment such as a cloud environment. The computer system of FIG. 17 can be used to implement the features described in FIGS. 1-16. For example, the user device 102 of FIGS. 1 and 2 or the user interfaces of FIGS. 3-12 can correspond to the display 912, input device 914, and or cursor control 916 of FIG. 17. The server 182 or the audio data server 132 of FIG. 1 or the computing devices 122 or 132 of FIG. 2 can be all or a portion of the system 900, the host(s) 924, and/or the server(s) 930 of FIG. 17.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others.

The scope of certain inventions disclosed herein is indicated by the appended claims rather than by the foregoing description. All changes which come within the meaning and range of equivalency of the claims are to be embraced within their scope.

Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method, performed by a computing system having one or more hardware computer processors and one or more non-transitory computer readable storage devices storing software instructions executable by the computing system to perform the computer-implemented method, the computer-implemented method comprising: accessing a database of a plurality of tracked objects; accessing audio data; generating a target language transcript based on at least the audio data; analyzing the target language transcript to extract one or more entities; providing a user interface configured for user analysis of at least the target language transcript, the user interface including at least: a first panel including the target language transcript; a second panel including controls for audio playback of the audio data; and a third panel including one or more suggested tags associated with the one or more entities; receiving a user input selecting a first suggested tag of the one or more suggested tags, the first suggested tag associated with a first entity of the one or more entities; and in response to the user input: either (1) generating a first tracked object representative of the first entity, or (2) determining a first tracked object of the plurality of tracked objects representative of the first entity; and tagging the audio data and the target language transcript with the first tracked object, wherein the tagging comprises linking the first tracked object with the audio data and the target language transcript.

Clause 2: The computer-implemented of Clause 1 further comprising: in response to the user input, updating the third panel to remove the first suggested tag and to indicate the tagging of the audio data and the target language transcript with the first tracked object.

Clause 3: The computer-implemented of any of Clauses 1-2, wherein the audio data is foreign language audio data.

Clause 4: The computer-implemented of Clause 3 further comprising: generating a foreign language transcript based on at least the foreign language audio data; and generating the target language transcript based on at least translating the foreign language transcript.

Clause 5: The computer-implemented of Clause 4, wherein the foreign language transcript and target language transcript are generated by the use of machine learning.

Clause 6: The computer-implemented of Clause 5, wherein the foreign language transcript and target language transcript are generated by combining the results of multiple machine learning models.

Clause 7: The computer-implemented of Clause 4 further comprising: receiving from the user, via the user interface, feedback regarding transcription accuracy of the foreign language transcript or translation accuracy of the target language transcript; and using the feedback to at least one of: generate a more accurate model for transcribing foreign language audio, or generate a more accurate model for translating foreign language transcripts into target language transcripts.

Clause 8: The computer-implemented of any of Clauses 1-7 further comprising: receiving from the user, via the user interface, feedback regarding transcription accuracy of the target language transcript; and using the feedback to generate more accurate model for transcribing audio data.

Clause 9: The computer-implemented of any of Clauses 1-8 further comprising: generating an acoustic fingerprint for a speaker of the audio data; and identifying the speaker in other audio data based on the acoustic fingerprint.

Clause 10: The computer-implemented of Clause 9 further comprising diarizing the audio data to separate audio data by speaker.

Clause 11: The computer-implemented of any of Clauses 1-10, wherein the first tracked objected is generated in response to a failure to identify, from the plurality of tracked objects, a first tracked object representative of the first entity.

Clause 12: A system comprising: a computer readable storage medium having program instructions embodied therewith; and one or more processors configured to execute the program instructions to cause the system to perform the computer-implemented method of any of Clauses 1-11.

Clause 13: A computer program product comprising a computer readable storage medium having program instructions embodied therewith, the program instructions executable by one or more processors to cause the one or more processors to perform the computer-implemented method of any of Clauses 1-11.

What is claimed is:

1. A computer-implemented method, performed by a computing system having one or more hardware computer processors and one or more non-transitory computer readable storage devices storing software instructions executable by the computing system to perform the computer-implemented method, the computer-implemented method comprising:
   accessing a tracked object database that stores a plurality of tracked objects;
   accessing audio data;
   generating a target language transcript based on at least the audio data;
   analyzing the target language transcript to extract one or more entities;
   providing a user interface configured for user analysis of at least the target language transcript, the user interface including at least:
   a first panel including the target language transcript;
   a second panel including controls for audio playback of the audio data; and
   a third panel including one or more suggested tags associated with the one or more entities, wherein the one or more suggested tags are indicated by respective selectable user interface buttons;
   receiving, via the third panel of the user interface, a first user input selecting a first selectable user interface button for a first suggested tag of the one or more suggested tags, the first suggested tag associated with a first entity of the one or more entities;

in response to the first user input received via the third panel:

either (1) generating a first tracked object representative of the first entity, or (2) determining a first tracked object of the plurality of tracked objects representative of the first entity; and tagging the audio data and the target language transcript with the first tracked object, wherein the tagging comprises linking the first tracked object with the audio data and the target language transcript;

receiving, via the third panel of the user interface, a second user input selecting a second selectable user interface button for a second suggested tag of the one or more suggested tags, the second suggested tag associated with a second entity of the one or more entities;

in response to the second user input received via the third panel:

either (1) generating a second tracked object representative of the second entity, or (2) determining a second tracked object of the plurality of tracked objects representative of the second entity; and tagging the audio data and the target language transcript with the second tracked object, wherein the tagging comprises linking the second tracked object with the audio data and the target language transcript.

2. The computer-implemented method of claim 1 further comprising:
in response to the first user input, updating the third panel to remove the first suggested tag and to indicate the tagging of the audio data and the target language transcript with the first tracked object.

3. The computer-implemented method of claim 1, wherein the audio data is foreign language audio data.

4. The computer-implemented method of claim 3 further comprising:
generating a foreign language transcript based on at least the foreign language audio data; and
generating the target language transcript based on at least translating the foreign language transcript.

5. The computer-implemented method of claim 4, wherein the foreign language transcript and the target language transcript are generated by a use of machine learning.

6. The computer-implemented method of claim 5, wherein the foreign language transcript and the target language transcript are generated by combining results of multiple machine learning models.

7. The computer-implemented method of claim 4 further comprising:
receiving from a user, via the user interface, feedback regarding transcription accuracy of the foreign language transcript or translation accuracy of the target language transcript; and
using the feedback to at least one of: generate a more accurate model for transcribing foreign language audio, or generate a more accurate model for translating foreign language transcripts into target language transcripts.

8. The computer-implemented method of claim 1 further comprising:
receiving from a user, via the user interface, feedback regarding transcription accuracy of the target language transcript; and
using the feedback to generate more accurate model for transcribing audio data.

9. The computer-implemented method of claim 1 further comprising:
generating an acoustic fingerprint for a speaker of the audio data; and
identifying the speaker in other audio data based on the acoustic fingerprint.

10. The computer-implemented method of claim 9 further comprising diarizing the audio data to separate audio data by speaker.

11. The computer-implemented method of claim 1, wherein the first tracked object is generated in response to a failure to identify, from the plurality of tracked objects, a first tracked object representative of the first entity.

12. A system comprising:
a computer readable storage medium having program instructions embodied therewith; and
one or more processors configured to execute the program instructions to cause the system to perform the computer-implemented method of claim 1.

13. A computer program product comprising a computer readable storage medium having program instructions embodied therewith, the program instructions executable by one or more processors to cause the one or more processors to perform the computer-implemented method of claim 1.

* * * * *